United States Patent
Tunnell et al.

(10) Patent No.: US 9,979,724 B2
(45) Date of Patent: *May 22, 2018

(54) DISTRIBUTED METHOD AND SYSTEM TO IMPROVE COLLABORATIVE SERVICES ACROSS MULTIPLE DEVICES

(71) Applicant: NXT-ID, Inc., Shelton, CT (US)

(72) Inventors: Andrew Tunnell, Palm Bay, FL (US); Justin Mitchell, Saint Cloud, FL (US); Sean Powers, Melbourne, FL (US); David Tunnell, Palm Bay, FL (US)

(73) Assignee: NXT-ID, INC., Shelton, CT (US)

(*) Notice: Subject to any disclaimer, the term of this patent is extended or adjusted under 35 U.S.C. 154(b) by 133 days.

This patent is subject to a terminal disclaimer.

(21) Appl. No.: 15/018,496

(22) Filed: Feb. 8, 2016

(65) Prior Publication Data

US 2016/0234206 A1    Aug. 11, 2016

Related U.S. Application Data

(60) Provisional application No. 62/113,114, filed on Feb. 6, 2015.

(51) Int. Cl.
*H04L 29/06*     (2006.01)
*H04W 4/00*      (2018.01)

(52) U.S. Cl.
CPC ...... *H04L 63/0861* (2013.01); *H04L 63/0428* (2013.01); *H04W 4/005* (2013.01); *H04W 4/70* (2018.02)

(58) Field of Classification Search
CPC .................................................. H04L 63/0861
USPC ............................................................ 726/6
See application file for complete search history.

(56) References Cited

U.S. PATENT DOCUMENTS

| | | | |
|---|---|---|---|
| 6,219,645 B1 | 4/2001 | Byers | |
| 6,766,295 B1 | 7/2004 | Murveit | |
| 7,925,022 B2 * | 4/2011 | Jung | H04L 63/061 380/247 |
| 9,224,096 B2 * | 12/2015 | Oppenheimer | G06F 21/50 |
| 9,292,832 B2 | 3/2016 | Goel | |
| 2011/0054891 A1 | 3/2011 | Vitte | |
| 2016/0127900 A1 | 5/2016 | Archibald | |

* cited by examiner

*Primary Examiner* — Longbit Chai
(74) *Attorney, Agent, or Firm* — John L. DeAngelis; Beusse Wolter Sanks & Maire

(57) ABSTRACT

A distributed system and method to improve collaborative service across multiple sensors on various devices. According to one embodiment, multiple devices may be used to train and then utilize a common algorithm for purposes including but not limited to recognizing a source to perform some action, control, command, calculation, storage, retrieval, encryption, decryption, alerting, alarming, notifying or as in some embodiments, to authenticate. In one embodiment of the invention, devices with one or more sensors such as but not limited to microphones, acoustic arrays or audio sensors may contribute to one or more models by sending samples, features, recognition scores, and/or risk scores to each other to improve collaborative training, signal quality, recognition, synchronization, inter-device proximity location and/or fusion of recognition scores and/or risk scores.

23 Claims, 19 Drawing Sheets

| | Identities | Identity | Non-limited Examples |
|---|---|---|---|
| User | Biometric | "Someone(s) you are" | Voice, Face, IRIS, Face |
| | Secret | "Something(s) you know" | PIN, Password/phrase/code, Gesture, Sequence, Pattern |
| | Behavior | "How you behave" | Various habits, sites visited, movements |
| | Serial # | "Some serial number you have" | Serial # |
| Device | eID | "Something you have" | DeviceID1, WalletID1, Model # |
| | Proximity | "Some thing(s) you have" | DeviceID1, DeviceID2... |
| Group | | "Group(s) you belong" | GroupID1, GroupID2,... |
| Location | | "Somewhere you are at" | Location, Fence, Proximity,... |
| One-time pad | | "Random number you have" | Random Number |
| Session or Transaction | | "Some event/time/details of a specific session or transaction" | Restrictions on Use,... |
| FW / SW | | "FW and/or SW that you have" | Firmware and/or Software Signature(s) |
| Account | | "Some account(s) you have" | Account Numbers, Aliases,... |
| Brand | | "Some manufacture or brand of what you have." | Manufacturer or Brand ID |
| Sound | | "Some sound you (or a device) makes" | Noise or Sound Characteristic(s) |
| Time | | "Some time" | Time 1 or time delta |

Fig. 9

DISTRIBUTED METHOD AND SYSTEM TO IMPROVE COLLABORATIVE SERVICES ACROSS MULTIPLE DEVICES

CROSS REFERENCE TO RELATED APPLICATIONS

This patent application claims the benefit of U.S. provisional patent application filed Feb. 6, 2015 assigned Application No. 62/113,114, which is incorporated herein.

FIELD

The present invention relates to the general field of collaborative services, including authentication and controls, as distributed across multiple electronic devices.

BACKGROUND

Use of biometrics to authenticate individuals is becoming more commonplace. Voice recognition in particular is increasing in popularity due to its accuracy, ease of use, and low power requirements. Many electronics manufacturers are now pushing voice recognition into smaller and lower power products such as mobile and wearable devices. Likewise, many other authentication techniques are also making their way to consumer electronics, including but not limited to face, iris, gesture and even gait recognition. Similarly, many of the same technologies are also used for control mechanisms, especially the use of voice to command various services such as multimedia, lighting and environmental systems such as that used within the "smart home".

As more mobile devices are used to perform services such as home automation and authentication, a chief problem arises: How is the performance of recognition maintained across multiple devices? This problem is exacerbated when considering disconnected recognition, where authentication services such as voice and/or sound recognition, for example, are performed without reach-back to common services or cloud computing services.

Devices may have one or more sensor subassemblies such as microphone subassemblies for example. Each microphone subassembly may have one or more microphones, filter extraction, filter/gain stages and A/D (analog-to-digital) characteristics that affect the sensitivity and performance of sound and voice recognition. Thus, the same algorithm and/or models may or may not perform as well across multiple devices.

Existing innovation in the field of the present invention predominantly involves leveraging multiple microphones on the same device to help filter noise and improve signal processing. Published US patent application US2011/0054891 is an example of a plurality of microphones used on a multi-microphone device to reduce and filter noise. Commercial devices such as the Blackberry Z30, for instance, include two or more microphones for the specific purpose of noise cancelation.

Other relevant references include telephony services such as over-the-phone bill pay that may utilize speaker recognition for verification purposes. U.S. Pat. No. 6,766,295 describes a method to adapt a speech model over several remote recognition sessions assuming the use of different microphones for each session.

U.S. Pat. No. 6,219,645 describes an automatic speech recognition system that utilizes a central processing controller to choose from a plurality of microphones, using the microphone with the best signal to perform speech recognition. More recently, the Amazon Echo is an example of one device that recognizes voice commands to perform various controls such as select music and change lighting.

SUMMARY

A distributed system and method to improve collaborative service across multiple sensors on various devices is disclosed. According to this invention, multiple devices may be used to train and then utilize a common algorithm for purposes including but not limited to recognizing a source to perform some action, control, command, calculation, storage, retrieval, encryption, decryption, altering, alarming, notifying or as in some embodiments, to authenticate. In one embodiment of the invention, devices with one or more sensors such as but not limited to microphones, acoustic arrays or audio sensors may contribute to one or more models by sending samples, features, recognition scores, and/or risk scores to each other to improve collaborative training, signal quality, recognition, synchronization, inter-device proximity location and/or fusion of recognition scores and/or risk scores.

This invention is non-limiting to the sensor of audio collection or the service of voice recognition, but inclusive to collaborative devices and services whereby multiple sensors, algorithms, computational and other resources on multiple devices may be utilized to collaboratively improve services. Optical, thermal, scent, vibration and even new sensors that detect brain waves are other non-limiting examples of sensors that may also be used to collect information about the environment and collaborate with other devices to improve collaborative services. In one embodiment, the enhanced collaborative services can increase confidence in an authentication action. In another, the enhanced collaborative services can perform some actions such as but not limited to manage lighting or irrigation, or access, store, retrieve, encrypt or decrypt data, as non-limiting examples.

Since some devices, such as servers, cell phones or laptops, have more processing power than other devices, such as wearables, devices may negotiate which are best suited to perform specific collaborative tasks depending on operating characteristics of the devices, such as power, bandwidth, proximity, etc.

A common algorithm model can be distributed to each device to perform user or device recognition, for example, locally on a single device, as well as one or more servers or cloud-based devices and/or distributed across a cluster of devices.

According to one embodiment, features, recognition and/or risk scores captured by any device may be cached until a connection with another device or a model generator is available to update and/or "train" the common recognition model. Once updated, the model may be cached until connection with other devices is once again established to distribute the model to the other devices to improve distributed sound and recognition across distributed devices. Services such as voice recognition may be speaker dependent or in other embodiments, speaker independent.

Operating characteristics that may be used to assign the collaborative tasks include processing power, bandwidth, range, availability (some devices may be busy collecting data while others sit idle), memory capacity, availability of the processing algorithm, available power (some devices may exhibit lower power while others are continuously powered), sensor quality and the like. According to the invention, a network of these collaborative devices can self-adjust or self-optimize through balancing the load between data collection and utilization of processing/memory resources.

BRIEF DESCRIPTION OF THE DRAWINGS

FIG. 9 describes non-limiting examples of identifiers that can be utilized for one or more devices to recognize and/or authenticate one or more other devices.

DETAILED DESCRIPTION

Before describing in detail particular distributed methods and systems to improve collaborative services across multiple devices, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

Figure 1:
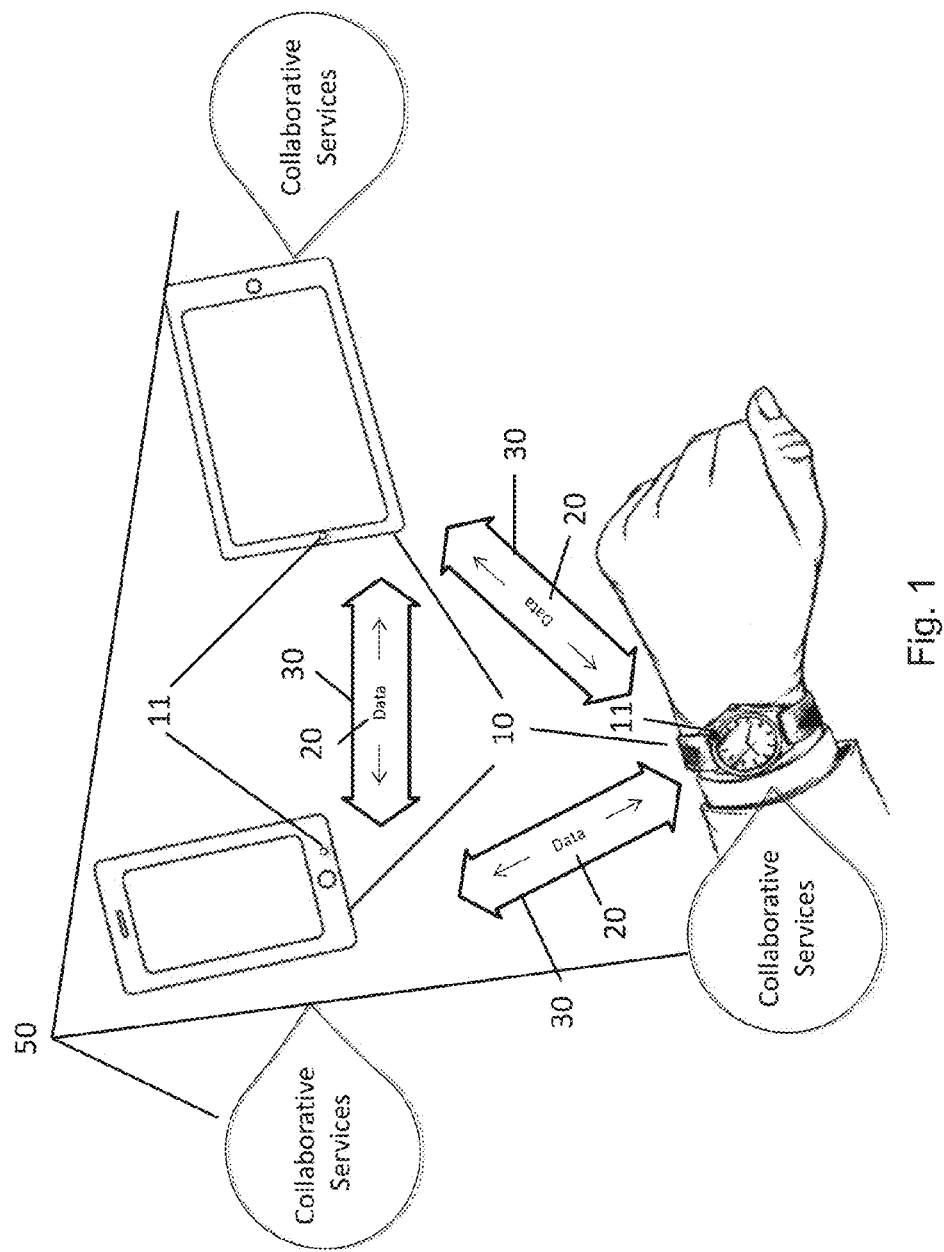
FIG. 1 illustrates collaborative services distributed across multiple devices.

This invention discloses a new and non-obvious concept, referred to as collaborative services, and a distributed system and method to facilitate and improve collaborative services 50 among various devices 10 within the "internet of things." See FIG. 1. A collaborative service 50 is a feature or capability that may be common to multiple devices 10 (e.g., electronic devices) or serviced by one or more devices 10 to one or more other devices 10 via data 20 or communications paths 30.

Generally, collaborative service(s) suggests a degree of interaction between collaborating devices. For non-limiting examples, multiple devices may wish to collaborate to perform some action, control, command, calculation, storage, retrieval, encryption, decryption, or to authenticate, or in some embodiments, combinations of each. The collaborating devices in such examples may reach a more definitive, and sometimes faster result than any one of the devices acting alone. Such interaction may relate to analysis of different portions of data, analysis of the same or different data from the same or different sensors, analysis using the same or different algorithms, or any combinations thereof.

When a source (a human user, a physical-object user (such as a robot), a device, a "thing" of the "internet of things," etc.) wishes to gain access to an access-controlled system, or unlock a house, garage, car or safe door, for instance, he/she/it may provide specific credentials that can be input into one or more of the devices. As a non-limiting example, a he/she/it may speak or issue a word or phrase, make either an audible or non-audible sound or vibration; or perform some gesture; or think something using recognizable brain waves; or in some embodiments, simply act naturally but be physically present. A sensor 11 (e.g., a microphone, a camera, or other sensor, which may be hidden from view in FIG. 1) on one or more of the devices 10 may capture and quantize, digitize or otherwise collect data from the sensor in order to analyze it. Now referred to as "data," this data may be passed between or among devices 10 over a communications path 30 governed by an applicable communications protocol.

According to one embodiment, each receiving device analyzes the data transmitted to it. The receiving devices may then collaborate to determine whether the source is authorized to gain access to the access-controlled area, device(s), or system, or to perform some action such as but not limited to turning up the volume on music, calculating rewards for a payment transaction, or deducting a transaction from a budget or account, as non-limiting examples. Collaboration may include but is not limited to collection, filtering, quantizing, digitizing, analyzing, calculating, processing, alerting or alarming, notifying, matching, scoring, comparing, or any other function required to fulfill the service. In example regarding access control or unlocking a door or equivalent, if the source is an authorized source, access is granted to the access-controlled area or system.

According to different embodiments of the invention, each receiving device may receive the same data or each may receive different portions of the data for analysis.

Additionally, each receiving device may employ the same or different recognition algorithms (also referred to as recognition models) to analyze the data it receives. And each receiving device may independently reach a conclusion as to whether the source is authorized to access the access-controlled area or system, or the receiving devices may collaborate to reach a conclusion as to whether the source is authorized to access the access-controlled area or system, for the access controlled example.

In some embodiments, a service may be operative only when it is located within a given environment, such as but not limited to a city, a given time, during a rainstorm, or a given location such as a shopping mall. The environment or time period for the service to be operable is called a "phenomenon" hereafter.

In an embodiment comprising a plurality of receiving devices performing authentication, each device may analyze the data representing the source it captured, and either independently authenticate the source or collaborate with other receiving devices to identify, recognize and/or authenticate the source.

It is not necessary for devices to collaborate to reach a result. Collaboration may simply provide a better result, a more accurate result, or a faster result. For a non-limiting example, each device may calculate its own score and compare that with other scores as calculated by other devices. These scores may be combined to reach an average, majority rules, or used as votes in a voting scheme. The higher (or lower) scores carry more prominence to authenticate a source based on a specified score threshold or threshold range.

The devices 10 that collaborate with other devices 10 are said to be "inter-aware." Devices 10 may become inter-aware through a prior authentication process and/or by passing information and/or data 20 across the communication path 30. The devices 10 may "know" each other exists, identify a communications path between them, and be aware of the resources and/or capabilities of the other "inter-aware" devices.

"Inter-aware" devices are aware of the existence and capabilities of other inter-aware devices. Thus these inter-aware devices can communicate with each other, receive sample identification data from each other, and share resources with each other.

The inter-aware devices can, for example, be initially known to each other (for example, when the device is powered up) via some shared information that can be used by one device to recognize another, such as but not limited to a pairing code. In some embodiments, one device may request a code from another device, whereby a user or entity may input the code that is to be shared. Once two or more devices are initially made aware, they may improve their "trust" over time via multiple collaborative service and/or authentication interactions.

Devices may also discover one another via a search or by finding a new device appearing within a network, or search. Upon discovery, devices may execute introduction processes, and can become aware of each other through their interaction over time.

Over time, users, devices, and/or applications executing on a device gain a "history" of interacting with other users, devices, and/or applications. Inter-awareness or "familiarity" between users, devices 10, objects, "things" and/or applications increases the capabilities and accuracy of collaborative services beyond what one device can perform alone. One or more users, devices, phenomenon, things, or applications may gain "trust" as a result of recurring "history."

In one non-limiting embodiment, one or more numbers, characters and or values may be added to a recognition score to indicate that one or more devices had a successful authentication. These "added" values may be placed at the front or the end of the recognition score, or they may be calculated and/or hashed with the score. However, in yet another non-limiting embodiment, the process of dynamic pairing, as described in commonly-owned US patent application, which is incorporated herein, filed on Mar. 17, 2014, assigned application Ser. No. 14/217,202, and entitled The Unpassword: Risk Aware End-to-End Multi-factor Authentication Via Dynamic Pairing, may be used to indicate a successful authentication.

Figure 2:
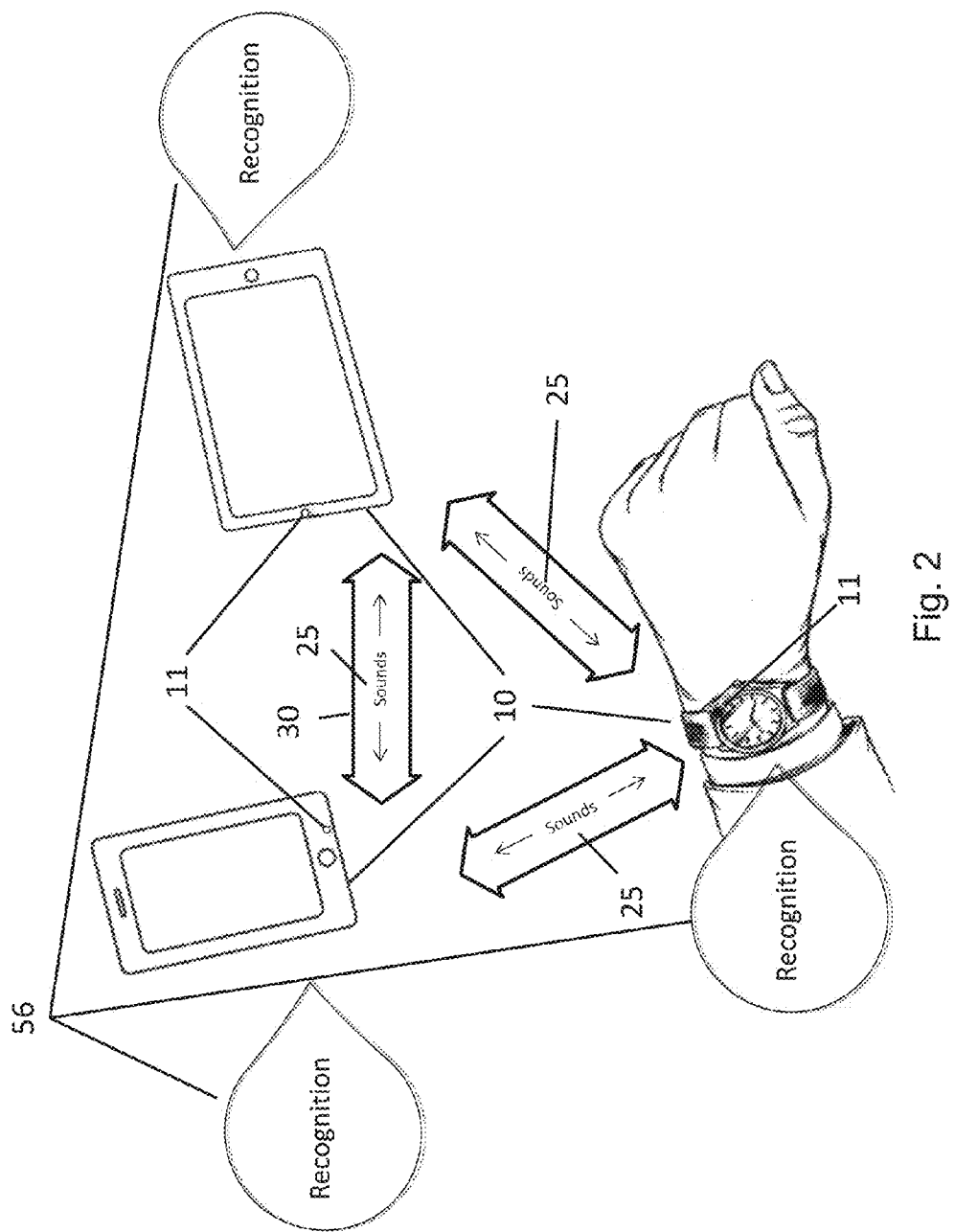
FIG. 2 illustrates a recognition service that utilizes sound, for example, to perform voice recognition across multiple devices.

For instance, a device 10 that performs some service, such as authentication, could use a recognition process (also referred to as a recognition algorithm or model 56) local to the device 10 as shown in FIG. 2. In one non-limiting example, the recognition process 56 utilizes biometrics to authenticate a source (e.g., a user, device, "thing," phenomenon, or application).

In prior art, the accuracy of this authentication depends solely on the accuracy of the sensors 11 and the algorithms and processing capabilities that facilitate recognition on that single device 10. This may not only decrease the accuracy of an authentication, but also decrease security, given only one device is used to authenticate. According to one embodiment of the present invention, multiple sensors 11 (one or more on each device 10), multiple algorithms for processing or analyzing on multiple devices 10 collaborate to improve various aspects of the recognition process 56 including training the recognition model, feature extraction, determining recognition scores, and determining risk scores, and the like.

In one embodiment, training relates to taking feature points extracted from samples of data (such as identification data or vocal sounds in the case of speech, fiduciary points in the case of finger, feature points in the case of imagery, and so forth) and processing them through multiple iterations of a mathematical model, with multiple data samples. The greater the number of data samples the better the algorithm performs.

Using voice as a non-limiting example, Hidden Markov Models (HMMs) may be used to model users' speech utterances. Markov models are randomly changing systems where it is assumed that future states depend only on the present state and not on the sequence of events that preceded it. Speech can be modeled using HMMs since a speech signal can be viewed as short-time stationary signal when using a time-scale of ten to thirty milliseconds, but HMMs are also applicable to other information and authentication approaches as well.

Models are trained to estimate the parameters for the HMM. The parameter learning task in HMMs is to find, given an output sequence or a set of such sequences, the best set of state transition and emission probabilities. More training data available during the parameter learning task results in the model being more likely to accurately classify a user's utterance. The values stored in the model file can classify or separate the trained data (or data like it) from other 'non-trained' data (or data not like it).

Within this non-limiting example, a model may be trained to only understand voice of one specific individual. As features are extracted from utterances collected by the user saying the same word repeatedly, feature data is run through the algorithm, such as but not limited to a Baum-Welch algorithm, to derive the maximum likelihood estimate of the parameters of the HMM. The HMM can then be used to classify the trained users' speech. The model also can be re-trained, or adapted with more user utterance data to further improve its classification results.

In one embodiment, a biometric recognition process 56 (one form of an authentication process, see FIG. 2) employed across multiple devices 10 improves the likelihood of accurate recognition and therefore correct authentication. Because a larger sample size of recognition/risk scores is taken, a more definitive conclusion is reached and accuracy is increased. Accuracy may also be increased due to a more thorough recognition process, as multiple devices authenticate the same data in a different manner, such as with different models or at different distances and angles from the source.

Since the location, noise, sensitivity and quality of each sensor and associated electronics may vary, the data output from each device may vary as well. Those well versed in the art will recognize that associated electronics in this context may include but not be limited to one or more sensors, filters, amplifiers, noise cancellation electronics, analog-to-digital (A/D) converters, and other electronics that can affect the quality of the data that is captured.

More data from more sources increases the "richness" or diversity of the features used for training the model, which thereby increases the accuracy of the models as they are used to recognize from more and different environments. Models with increased accuracy therefore improve accuracy of the recognition/authentication and/or control processes. More data and/or audio features from more devices 10 of the same sound at the same relative time also provide a faster way to collect training data for one or more acoustic models. Thus, this method of using clusters of sensors speeds the training process by providing an easy way to obtain multiple instances of the same sound, word or phrase, in less time.

Each model may be associated with a specific action, control, command, information access, calculation, storage, retrieval, encryption, decryption or authentication, in some embodiments. These operations may include accessing certain devices, applications, or services, accessing an account and/or making a payment, as non-limiting examples.

In one non-limiting embodiment, two or more devices may recognize one another's relative positions using one or more techniques including but not limited to GPS (Global Positioning System), signal power, signal strength, time of arrival (TOA) and/or RFDOA (Radio Frequency Direction of Arrival) and the like. By knowing each device's respective locations, each device can determine where sounds 25 should come from by comparing coordinates of each sound 25 received as determined by the one or more microphones 11 on each device as well as the amplitude of each sound 25.

Under one embodiment, the majority of the devices may determine the correct position of the source. In some embodiments, this factor may be factored into the recognition/authentication score. As a non-limiting example, if one device senses data contradictory to the position that the other devices have determined, then the score from that device is downgraded. This increases accuracy by eliminating any "incorrect" data, as well as by adding an additional factor that is considered in the model.

Under another embodiment, the devices may detect whether one of the other devices is missing and send an alert to the user, or to one of the other devices. For a non-limiting example, one device, such as but not limited to a smart card, may send BLE communications and/or beacons to another device, such as but not limited to a phone or key chain. As the phone, key chain, and/or smart card are in communications, no alert is sent. As soon as one device does not respond, or after some time period no response is received by one or more of the other devices, the other devices may send an alert or indicator to the user and/or to other devices.

Alerts may be in the form of a sound, vibrator, display and/or other haptic or display type method to alert the user. Any one or more devices may contain one or more of these feedback mechanisms to alert, notify and or indicate to the user, device, object or "thing" that one of the other devices is missing.

In some embodiments, these alerts, notifications, indicators and the like may be used for other notifications such as but not limited to messages, texts, emails, wake-up, alarms, events, phone calls, social media, and/or other notifications and the like that one device may send to another. Under one embodiment, a phone could send a text message to a waterproof smart card while the user is in a swimming pool, for instance. Another non-limiting example is notification from a laptop to a waterproof smart card of a completed stock trade, reward points or balance, or even in some embodiments, a notification of a transaction request for approval for the given amount, account or other identifier associated with transaction to prevent fraud and/or manage a budget, accounting and/or other collaborative service.

To further enhance the recognition/authentication process each device 10 may comprise multiple sensors 11, such as one or more microphones.

The sound picked up by these microphonic sensors, in this non-limiting example, may include but is not limited to voice, whistles, clicks, claps, music or virtually any sound that a user or an inanimate object) wishes to generate. These are referenced collectively herein as sensor-collected "sounds" 25 as shown in FIG. 2.

In one embodiment, one or more devices 10 may contain one or more sensors 11 such as but not limited to microphones, microphone arrays and/or audio sensors, collectively called "microphones" herein. Sensors, of course, may also include but not limited to optical, infrared, thermal, humidity, scent, heartbeat, finger, IRIS, face, and virtually any sensor that may sense something about the environment or person.

Note that devices referred to herein may operate to authenticate a source (authenticating devices such as the devices 10 depicted in FIG. 1), operate as controlling devices to operate/control another device (again the devices 10 depicted in FIG. 1 may be controlling devices), and/or may be devices controlled (controlled devices) by a source after he/she/it has been authenticated.

Figure 3:
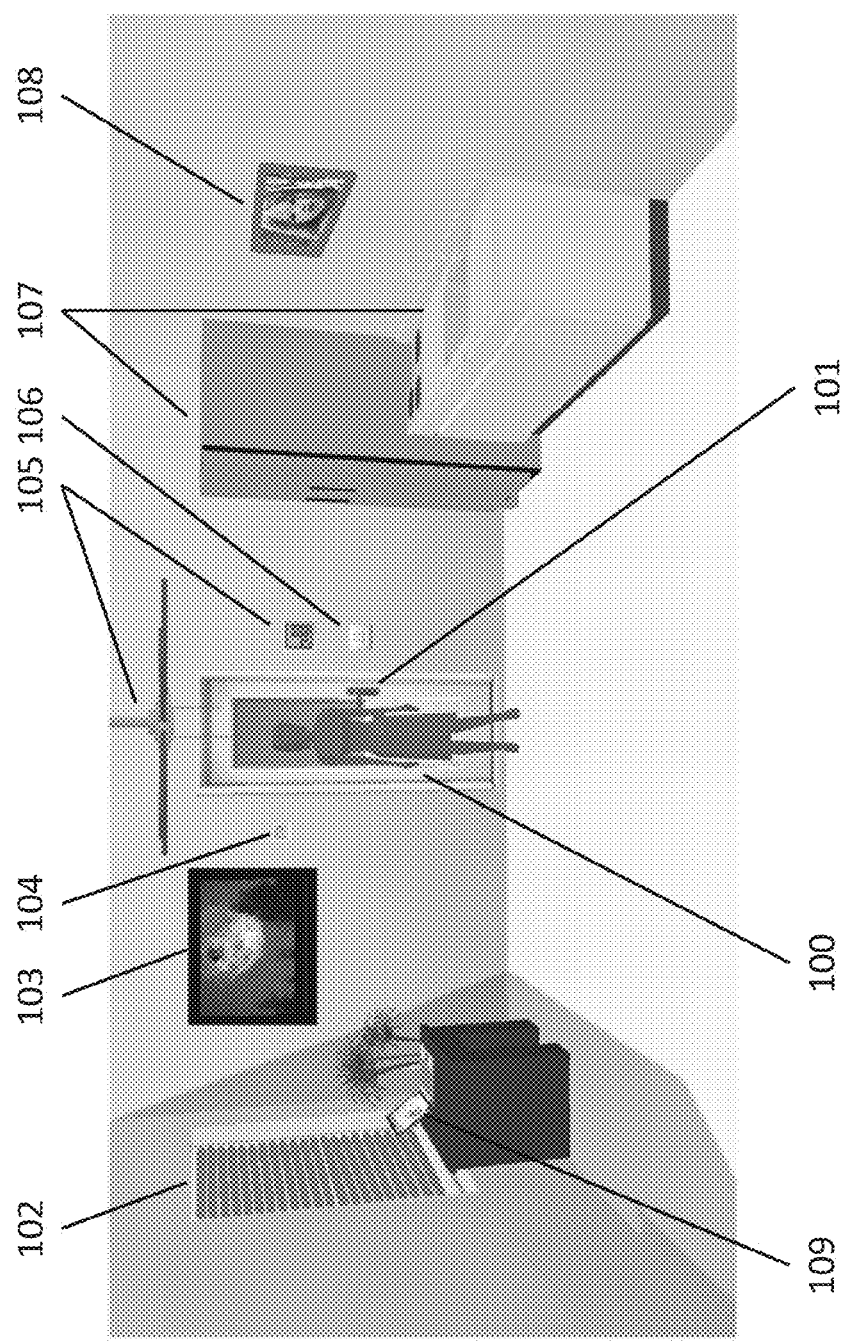
FIG. 3 illustrates one or more devices containing one or more sensors that could collaborate with one another to facilitate the "Internet of Things".

Devices that may fall into at least one of these three classes are illustrated in FIG. 3 and may include but are not limited to, door locks 101, blinds 102, televisions 103, home automation devices, thermostats 104, lights, fans, light switches 105, alarm systems 106, appliances 107, digital picture frames 108, cooking tools, music equipment, gaming equipment, desktop computers, computer servers, laptop computers 109, vehicles, garage door openers, keyless locks and other devices that facilitate the "internet of things."

Certain devices may more likely fit into one or both of the classes of authenticating devices and/or controlling devices and may include (see FIG. 4) mobile and/or wearable devices such as cell phones 120, watches 122, electronic or smart wallets 121, necklaces, bracelets, rings (not illustrated) and the like.

Figure 4:
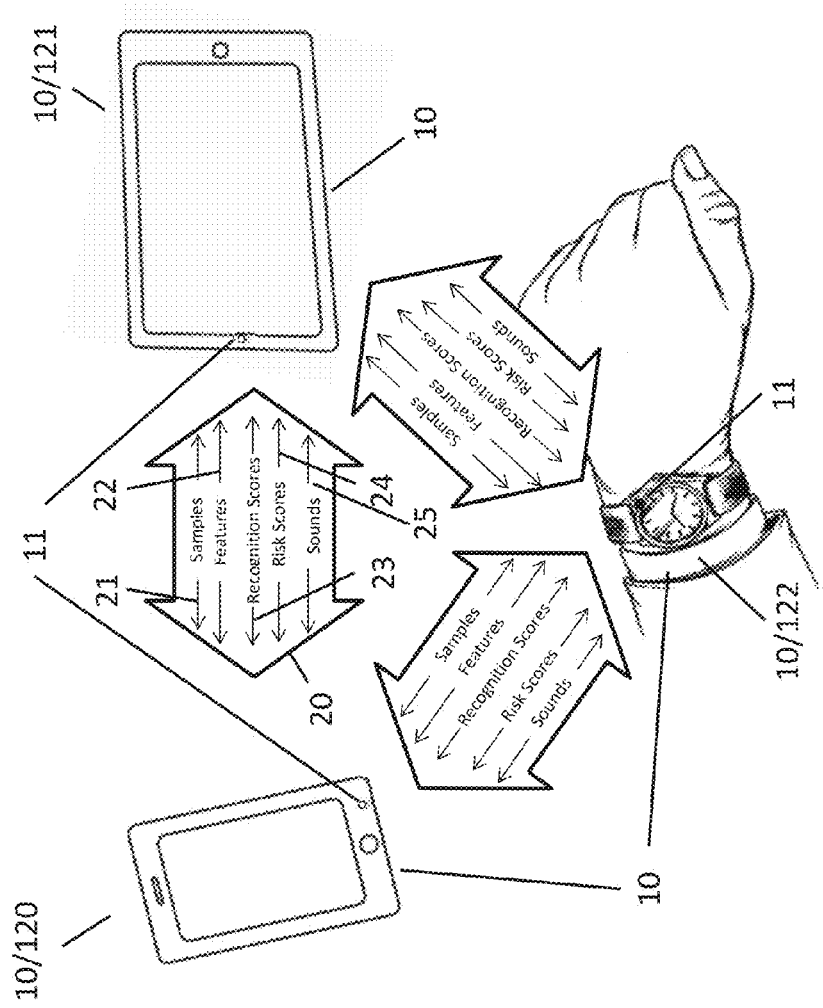
FIG. 4 illustrates one or more devices collaborating with one or more other devices by collecting and sharing data such as but not limited to samples, features, recognition scores and/or risk scores.

As also depicted in FIG. 4, one or more devices 10 may collaborate with one or more other devices 10 by collecting and sharing data 20 that is derived from sensor samples 21, sound features 22, authentication/recognition scores 23, risk scores 24, and sensor-collected sounds 25. Other exemplary types of shared data are referred to elsewhere herein.

The sensed information may be captured by a microphone on any one or more of the devices 10 and sent to one or more other devices 10 to perform collaborative services, such as recognizing a sound, word or phrase; authenticating a user or training a recognition model.

Bandwidth of the communications channel between two devices may be conserved, while throughput is enhanced, by one of the devices 10 sending only features 22 or a portion of a sensor-collected sound 25, as extracted from a sensor-collected sound, to one or more other devices 10, in lieu of sending all of the captured sound 25.

One or more of the devices 10 may send authentication/recognition scores 23 and/or risk scores 24 to one or more other devices to collaboratively authenticate a source and/or to collaboratively authenticate another device, or interpret a spoken word to take some action. In lieu of sharing risk and authentication/recognition scores, the devices 10 can share risk and authentication/recognition information related to risks or confidence associated with operation of the devices or information.

Devices 10 that have been authenticated to operate and collaborate with other devices 10 are said to be "inter-aware." Devices 10 may become inter-aware through a previous authentication/recognition process and/or through passing information or data 20 across a communication path 30 to perform some action. Information or data that is passed may include but is not limited to a one time code (OTC) or a temporary password. In one embodiment, one or more devices may send and receive back such codes to establish a trusted relationship with one or more other devices and thus become inter-aware.

Dynamic paring authentication (as described and claimed in the commonly-owned application referred to above) may also be used for this process to establish trust. In yet another embodiment, communication with any surrounding devices may precede any passing of codes or authentication through dynamic paring. By establishing trust, two or more devices initiate the first step to becoming inter-aware. In some embodiments, some devices may have established more trust than others, allowing them to be "more inter-aware". After establishing trust, information about or from each device (including each devices capabilities), source, user, phenomenon, or "thing" may be shared and distributed to the one or more trusted devices. In some non-limiting embodiments, a device may have to reach a certain trust threshold or a specified range to receive information, certain types of information, or a specified amount of information.

A non-limiting example of this may be a reaching a minimum risk score when authenticating with another device. In some cases (non-limiting), one device may receive more information if it has established more trust. Establishing more trust may occur over time, as more authentications occur (such as with dynamic paring). In a similar embodiment, information may be segmented into groups related to a specified level of trust. Such groups are hereafter referred to as "classifications." Each classification may represent a specified level of trust. Upon establishing trust, each device may receive the classification of information correlated to its given level of trust.

Those skilled in the art are aware of authentication methods that can be used, including symmetric techniques, asymmetric techniques, a combination of symmetric and asymmetric techniques, and/or dynamic pairing, as non-limiting examples.

Dynamic pairing in particular is described in U.S. patent application Ser. No. 14/217,202 filed on Mar. 17, 2014 and entitled, "The Unpassword: Risk Aware End-to-End Multi-factor Authentication Via Dynamic Pairing," which is incorporated herein by reference and describes a method and system where end points derive dynamic authenticate and encryption codes for a particular session from a dynamic pairing code and a history of risk scores. Dynamic pairing is one non-limiting example of how multiple devices may become inter-aware based on historical authentication that dictates "how well" the devices "know" each other.

Figure 5:
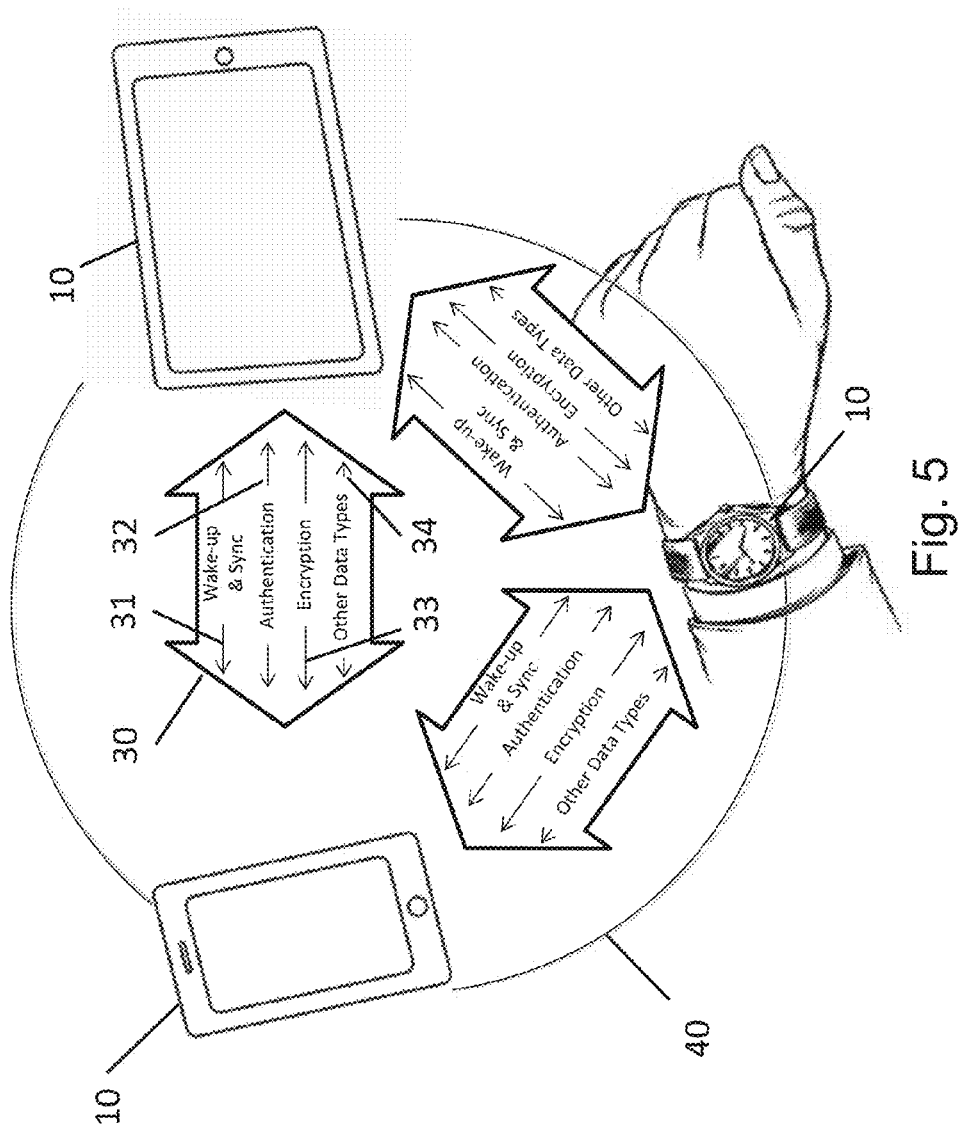
FIG. 5 illustrates communications that take place between devices including wake-up, synchronization, authentication, encryption and data.

Devices 10 that collaborate with one another may be collectively referred to as "collaborative clusters" 40 or "clusters" 40 herein, as shown in FIG. 5. In most preferred embodiments, devices that make up clusters are inter-aware.

FIG. 5 identifies other types of data that can be transferred between the devices 10 over communication paths 30, including wake-up and synchronization signals 31, authentication information or scores 32, encryption information 33 and other data types 34 not specifically identified.

Multiple devices 10 within a cluster 40 collaborate by communicating with one another to perform collaborative actions. It is readily recognized by anyone familiar with the art that communications techniques employed between devices 10 within clusters 40 may include but not be limited to acoustic, ultrasonic, Bluetooth, BLE (Bluetooth Low Energy), BodyCom (a short range wireless connectivity technology), WiFi, PAN (Personal Area Network), NFC (Near Field Communication), RFID (Radio Frequency Identification) and/or other RF (Radio Frequency) and/or acoustic communications collectively referred to as "communications" herein. Communications between devices 10 may utilize various protocols and network topologies within various embodiments that include but are not limited to TCP/IP (Transmission Connect Protocol/Internet Protocol), UDP (User Datagram Protocol), P2P (peer-to-peer), point-to-point, mesh networks, star and/or spoke and wheel. In some embodiments, these protocols and network topologies may be local rather than over the Internet, such as point-to-point or peer-to-peer networks over Bluetooth or local WiFi, as non-limiting examples. The various inventions described herein are communications protocol and network topology agnostic, independent of any specific communication method, frequency, protocol, or network topology.

Figure 6:
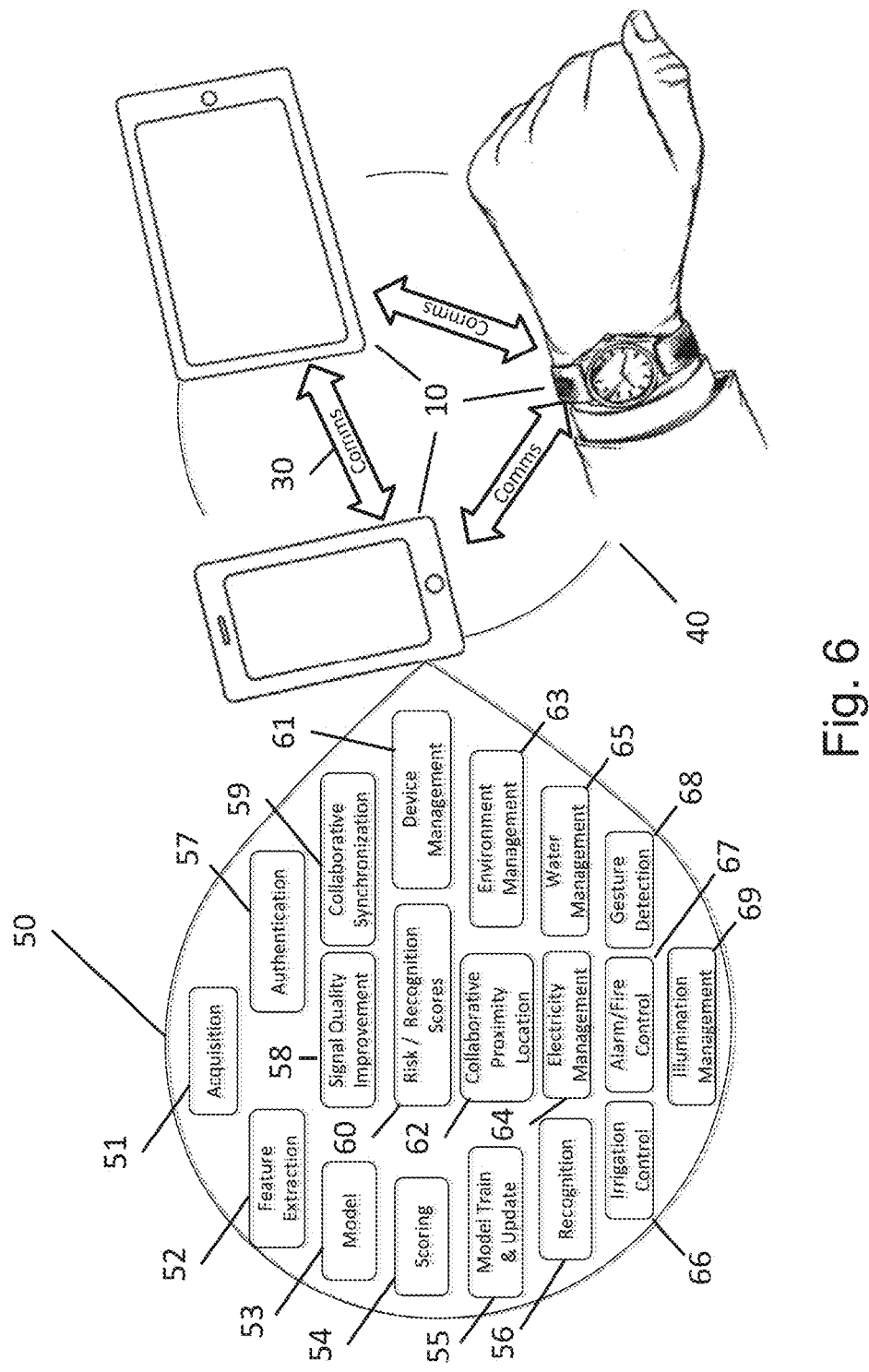
FIG. 6 shows non-limiting examples of collaborative services that can take place collaboratively among devices.

As illustrated in FIG. 6, inter-aware devices 10 within the cluster 40 may perform collaborative services 50 related to, but not limited to, collaborative acquisition 51, feature extraction 52, recognition models 53, (a mathematical model that yields a probability value, such as a hidden Markov model), scoring 54 (of results from the model, such as for risk and recognition scores), recognition model training and/or updating 55, recognition process/analysis 56, authentication 57, signal quality improvement 58, synchronization 59, risk and/or recognition scores 60, device management (such as turning devices on and off a device) 61, proximity location 62, environment management 63, electricity management 64, water management 65, irrigation control 66, alarm/fire control 67, gesture detection 68, and/or illumination management 69, all referenced herein as "collaborative services 50" or "services 50."

In other embodiments, collaborative services 50 may include, but are not limited to, services that activate and/or interact with other devices such as those described elsewhere herein, including those illustrated in FIG. 6.

Two or more devices 10 within a cluster 40 may be present in close enough proximity to one another such that the sensor 11 associated with each device 10 collects or senses the same sound information as sourced from a user.

In one non-limiting biometric example, any instance where a user speaks or generates a sound, two or more devices 10 within a cluster 40 may be sufficiently proximate such that each collects or senses the same sound 25. Since the devices 10 may be mobile and/or wearable and/or static, any combination of devices 10 within the cluster 40 may be present at any given time. In such instances, any and/or all devices 10 can be used to perform any and/or all parts of any collaborative service 50.

Figure 7:
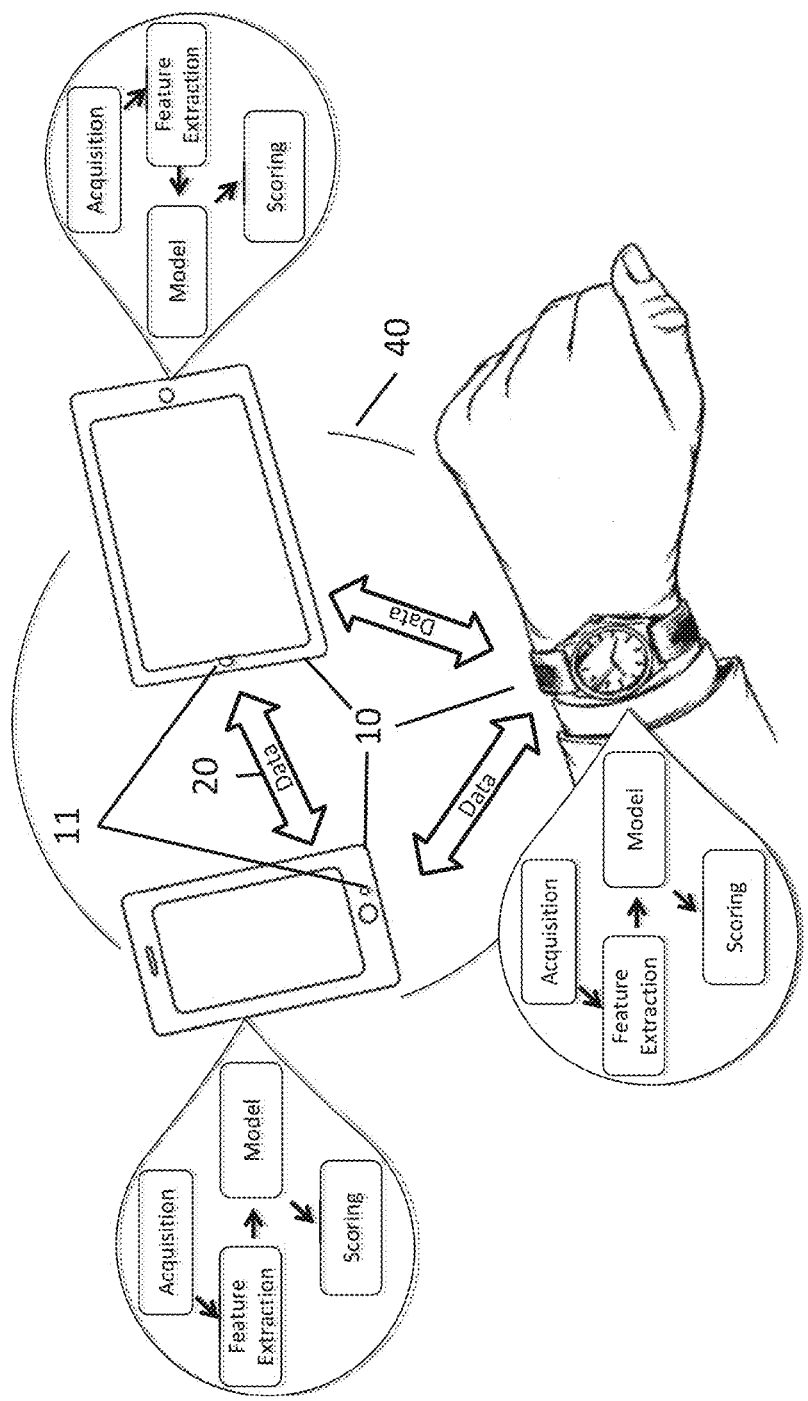
FIG. 7 illustrates data acquired by sensor sample acquisition, feature extraction and/or scoring that is passed between devices to facilitate collaborative services.

As data 20 (e.g., based on sensed sounds or another identifier, for example) is acquired and/or features extracted from the data within a collaborative cluster 40, recognition/authentication may be performed using a model and/or algorithm local to each device 10. See FIG. 7. As illustrated, each device 10 acquires an identifier (acquisition), extracts features therefrom, analyzes the features through a model, and determines a score indicative of the degree of confidence or risk associated with the score.

In one embodiment, the data 20 may be sent to other devices within the cluster 40 for use in a recognition/authentication process independently executed at each device. Use of a common scoring algorithm to perform the authentication process on one or more of the devices may improve the scoring.

In other embodiments, the data 20 may be sent to one or more other devices 10 to train models associated with the recognition/authentication process at each device 10. See FIG. 8.

Figure 8:
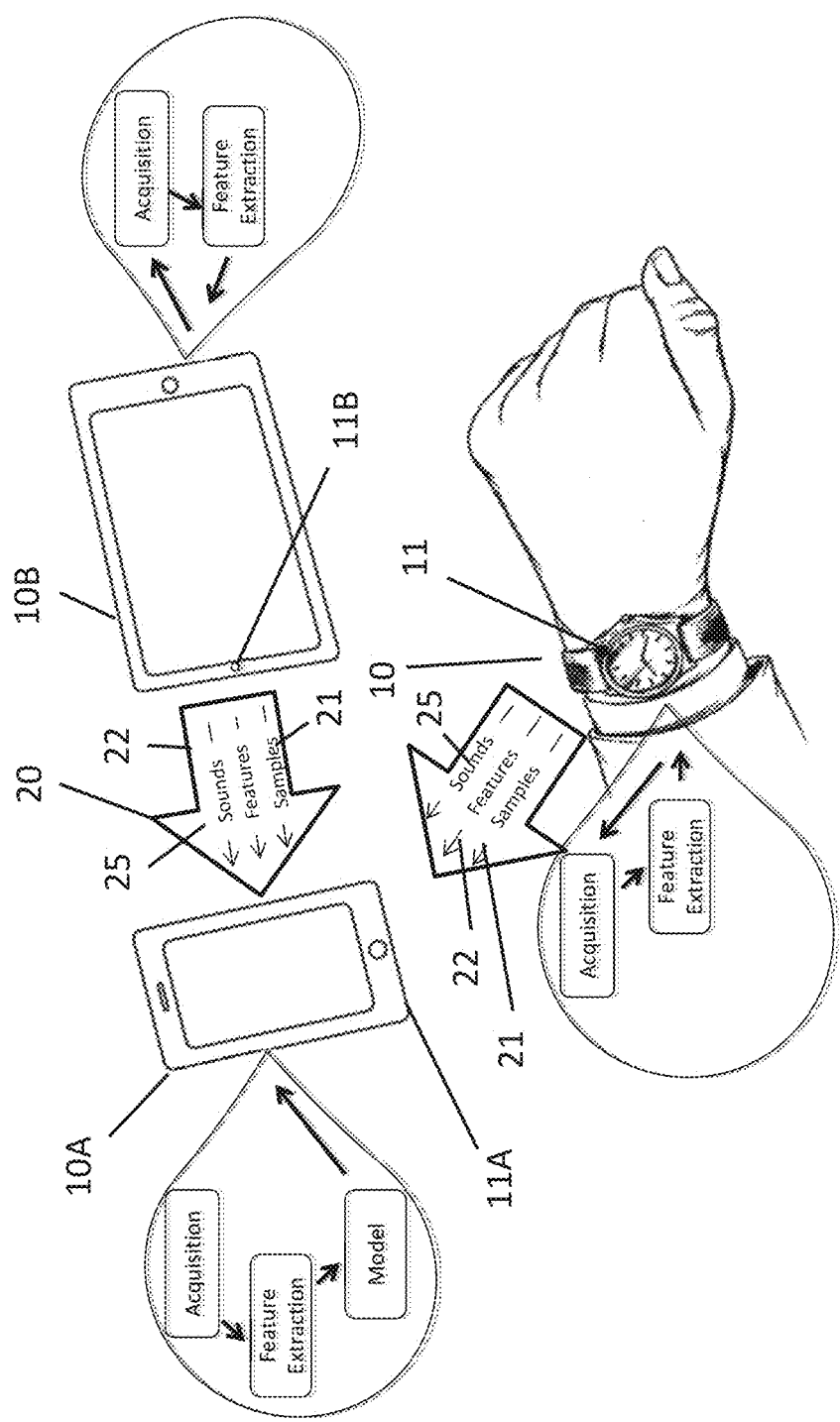
FIG. 8 illustrates collaborative training of a collaborative recognition model.

Models associated with a device 10A in FIG. 8 may be used with mathematical scoring algorithms to recognize a first person, a first device or a first application (i.e., a first user or a first source) by comparing the analysis of samples 21, features 22, and/or sounds 25 from the first person or device as sensed by a first sensor 11A, with samples 21, features 22, and/or sounds 25 from a second person, second device or second application as sensed by a second sensor 11B of a device 10B.

In another embodiment models associated with the device 10A may be used to recognize a first person, a first device, or a first application (a first source) by comparing analysis of samples 21, features 22 and/or sounds 25 as sensed by a first sensor 11 at a first time with samples 21, features, 22 and/or sounds 25 collected from the first person, the first device, or the first application (i.e., the first source) at a second time different from the first time.

Biometrics are one class of identification information that is becoming more commonly used to identity "Someone you are" using models such as those associated with the present invention. In other embodiments, other identifiers that the devices 10 may utilize, along with models to authenticate with other devices, include but are not limited to biometrics (someone you are), shared secrets (something you know such as PIN, pattern and/or gesture or the like); device identifiers such as serial number (some number you have), electronic identifiers (an eID or something you have), and proximity (something(s) you have); group identifiers (group(s) you belong to); location (somewhere you have been, are at now or are not at now); one-time pad (a random number you have); a session or transaction number (some event/time/details of a specific session or transaction); firmware (FW) or software (SW) (some firmware or software that you have); an account (some account or accounts you have); brand (some manufacture or brand of something you have); a sound (some sound you or a device makes; time (some time). Certain of these identifiers are referenced in FIG. 9.

An acoustic model, as used in the present invention, is a digital file used by a speech recognition engine for recognizing a user's speech. The file contains a statistical representation of the distinct sounds that make up each word in a language model or grammar. A speaker-dependent acoustic model is one type of acoustic model that has been tailored to recognize a particular person's speech, (i.e., identify the speaker) independent of the words spoken. Such acoustic models are trained using audio from a particular person's speech.

In the context of the present invention in a speaker-dependent model a user is authenticated if his speech (comprising a word, phrase or vocal sound, for example) is recognized as the speech of an authorized user. In one embodiment of the present invention it is desirable for the user to speak predetermined words that are used in the recognition/authentication process. These words are selected to increase the probability of correct recognition. But the user is authenticated solely on the basis of his/her speech (a "who you are test").

A speaker-independent acoustic model can recognize speech (more specifically can recognize a sound or a spoken word or phrase) from any person, including a person who has not submitted any speech audio for training the acoustic model. If the user speaks a predetermined password or pass code and the acoustic model recognizes it as the correct predetermined password or pass code, then the user is authenticated. Generally, more speech audio training data is required to create a speaker-independent model than a speaker-dependent model. This embodiment presents a "what you know" test.

In yet other embodiments, a model may recognize both the speaker and the word or phrase, thereby supporting 2-factor voice or sound recognition. The factors require that the user pass both a "who you are" test and a "what you know" test.

Figure 10:
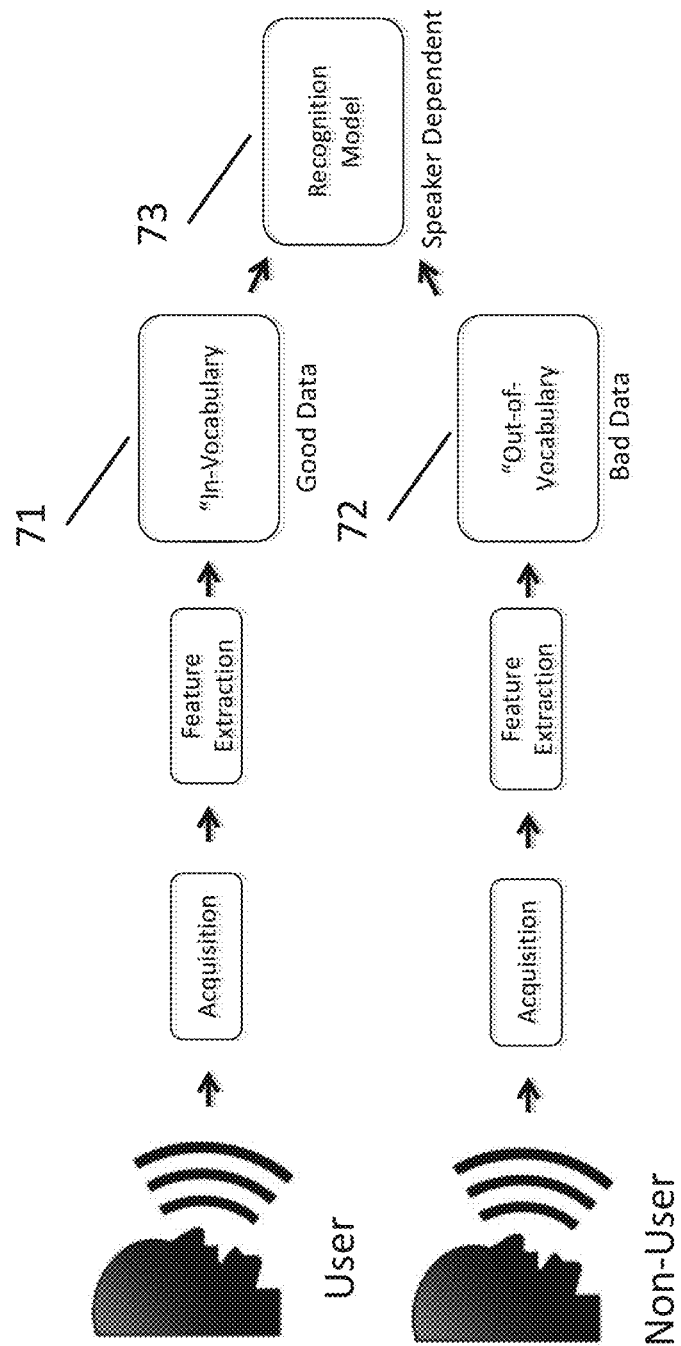
FIG. 10 illustrates training of speaker dependent acoustic models.
Figure 11:
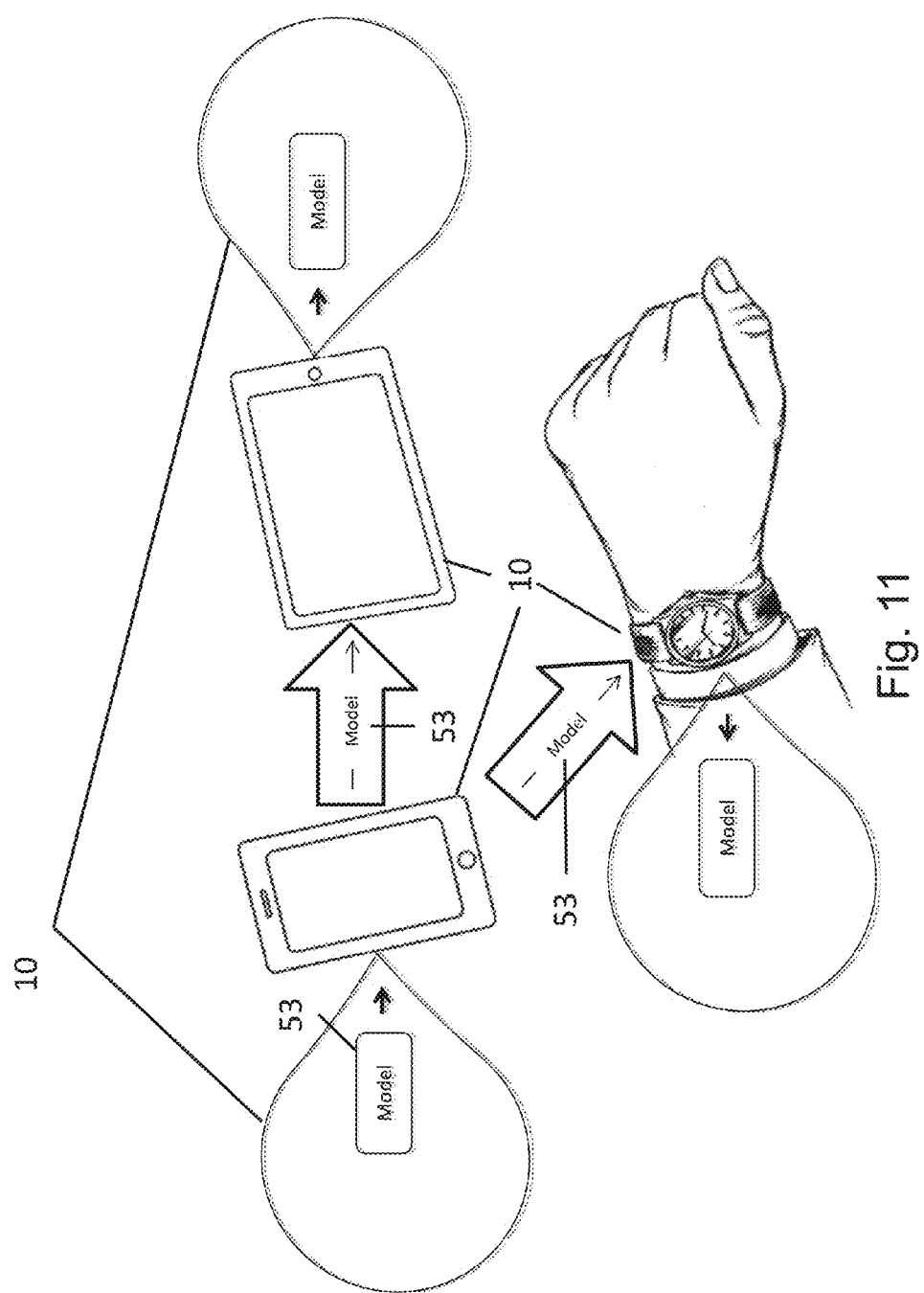
FIG. 11 illustrates distribution of models to multiple devices.

With reference to FIG. 10, for speaker-dependent acoustic models where the model distinguishes authorized and unauthorized users based on speech, "good data" is defined as an authorized user's spoken words that were actually meant to be a speaker input by the user. As a non-limiting example, the user may utter the word "Car" in a context, either in a sentence or by itself, that is recognized by one or more devices. This may be considered "good data", and will hereafter be referred to as speech that is "in-vocabulary" 71. In one non-limiting embodiment, good data or in-vocabulary 71 sound or speech may be used with "bad data," defined as speech or sound not from an authorized user as "out-of-vocabulary" 72 to train speaker dependent models 73 representing the legitimate user's speech. Sounds or speech that is considered out-of-vocabulary 72 may include but is not limited to background noise. The trained models 53 are then distributed to each device 10 such that any device may be used locally during active recognition as shown in FIG. 11.

Figure 12:
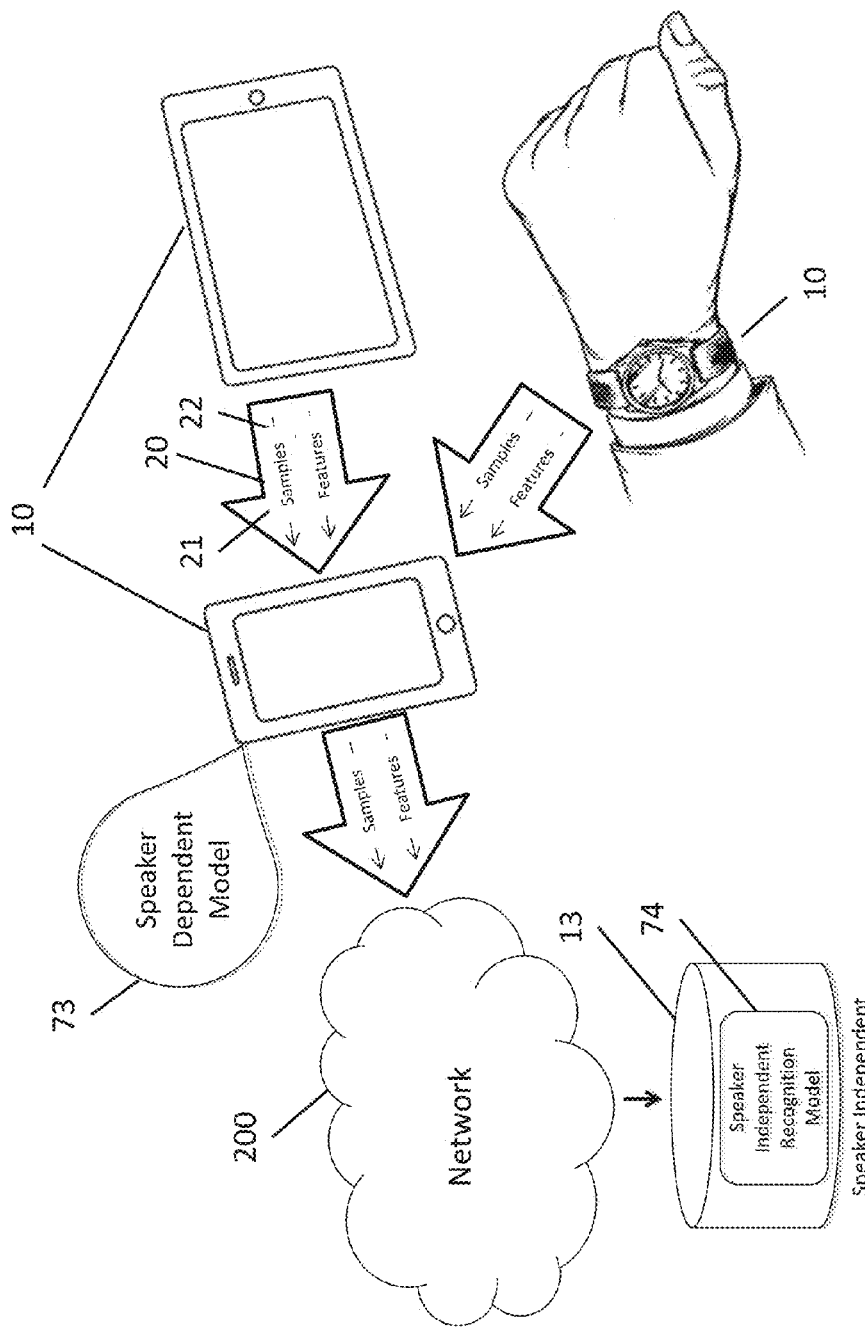
FIG. 12 illustrates training of speaker dependent acoustic models as well as speaker independent models, in this case, remote from local devices.

This invention supports both general-purpose speaker independent recognition models 74 as shown in FIG. 12 as well as speaker dependent models 73 as shown in FIG. 9. In the case of speaker independent models 74, sounds, samples 21 and/or features 22 collected from devices 10 in a cluster may be sent to one or more speaker independent models 74 on a server 13 or central processing unit, either directly or through one or more devices 10, or via a network 200, or both as shown in FIG. 12. Servers 13 typically are looking for speaker independent information and want as much data 20 as possible to improve the training of the speaker independent model 74. This method continuously improves training of speaker independent recognition models 74 to adapt to more microphones and environments as users and devices 10 are accessed.

Speaker dependent models 73 need to be kept as secure as possible, since they are used to recognize an individual speaker. It is advantageous to keep these models as local to the devices within a cluster as possible, rather than on a server or another device that is more prone to attack. This invention achieves a method that can update both speaker independent and speaker dependent models, while keeping speaker dependent recognition models localized to specific devices 10 or, if desired, distributed to both local and remote devices.

For speaker independent models, data of the same word or phrase are likewise trained, but the acoustic data is collected from different individuals so that only the model recognizes the word or phrase regardless of which individual spoke the sound, word, or phrase. For non-speech, common sounds are collected as acoustic data and used to train acoustic recognition models specific for certain non-speech sounds. This method of multiple devices working together to train one or more common recognition service(s) 53 is called "collaborative model training".

Figure 13:
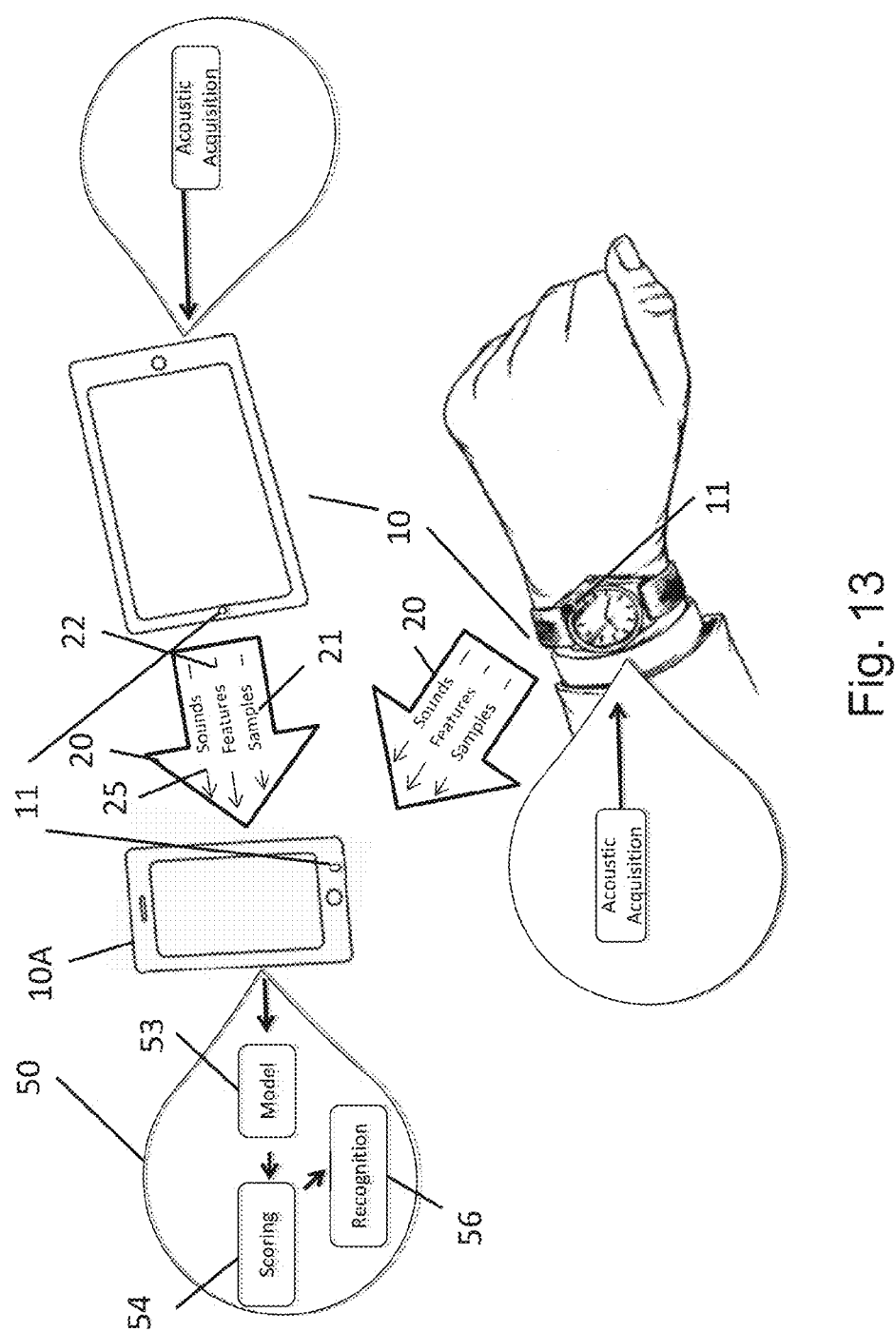
FIG. 13 illustrates a collaborative recognition service where one or more devices send samples, sounds and/or features to one or more other devices to achieve collaborative scoring.

Any device 10 capable of conducting collaborative services 50 may process data 20 such as but not limited to sounds 25, features 25, and other samples 21 (or other identification information) captured by one or more sensors 11, such as but not limited to microphones or a microphone array, to analyze the data 20 using recognition models 53 that result in a "collaborative recognition service 56" with one or more confidence scoring algorithms 54. See FIG. 13. [xxx] As illustrated in FIG. 13, in one embodiment, acoustic information may be captured by other devices 10 and sent to the device 10A that will perform the recognition. Device 10A may have greater processing power than the devices 10 and thus be better equipped to perform the recognition operation. In different embodiments the other devices 10 can perform recognition 56 and/or extract features 22 or samples 21 from the data 20 and transmit these features 22 or samples 21 to the device 10A for recognition analysis. Certain of these other devices 10 may be located remotely from the device 10A.

Figure 14:
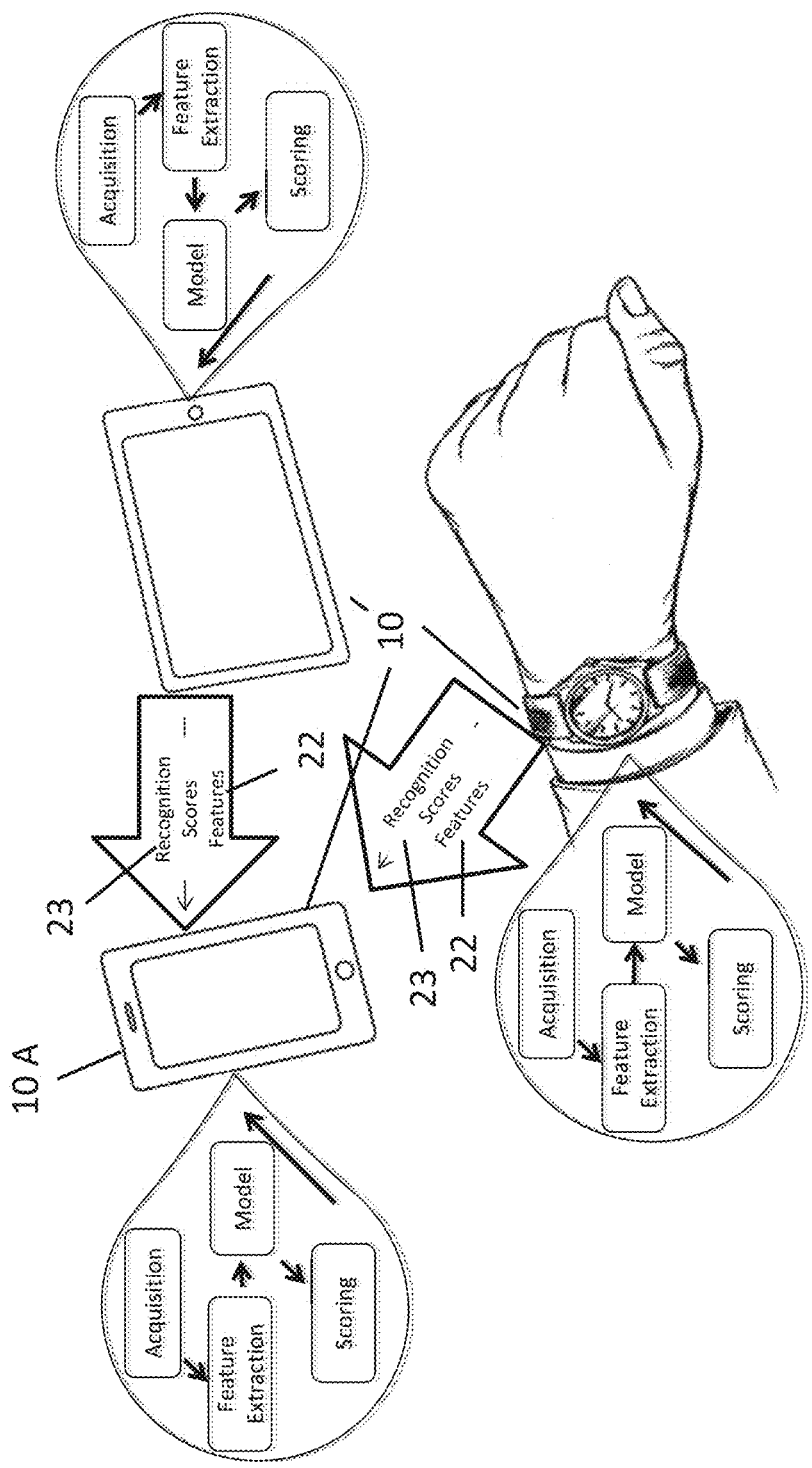
FIG. 14 illustrates a collaborative recognition service where recognition scores obtained from local recognition are sent to one or more other devices to improve recognition and/or authentication accuracy and/or speed.

In other embodiments, "a collaborative recognition service" may also take the form of devices 10 that send recognition scores 23 obtained from the local recognition process at each device, to other devices 10A to improve recognition accuracy as shown in FIG. 14. One or more devices 10 sending features 22 and/or recognition scores 23 to one or more other devices 10 is called "collaborative recognition" herein.

Figure 15:
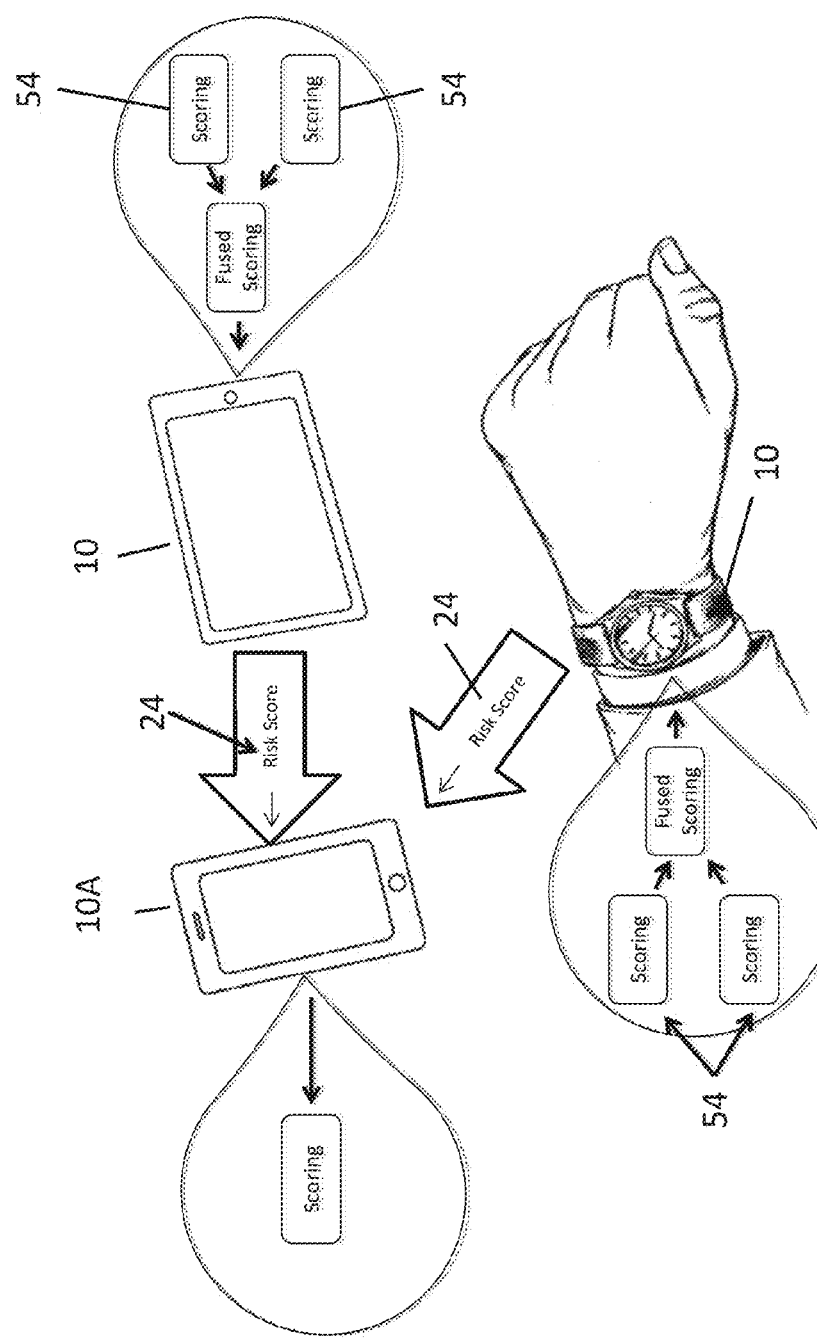
FIG. 15 illustrates devices deriving risk scores local to one or more algorithms on a device, which are then combined to achieve fused risk scores that can be sent to one or more other devices to achieve collaborative risk scores.

Like collaborative recognition, multiple recognition scores 54 from multiple factors within a device, including but not limited to sound recognition, may be combined and/or "fused" to provide an overall "risk score" 24. See FIG. 15. [xxx] In another embodiment, each device may derive its own risk score 24 local to the algorithm on the device 10 and send that risk score 24 to one or more other devices 10/10A. Both of these methods are referenced herein as "collaborative risk scoring" 54 as shown in FIG. 15.

Figure 16:
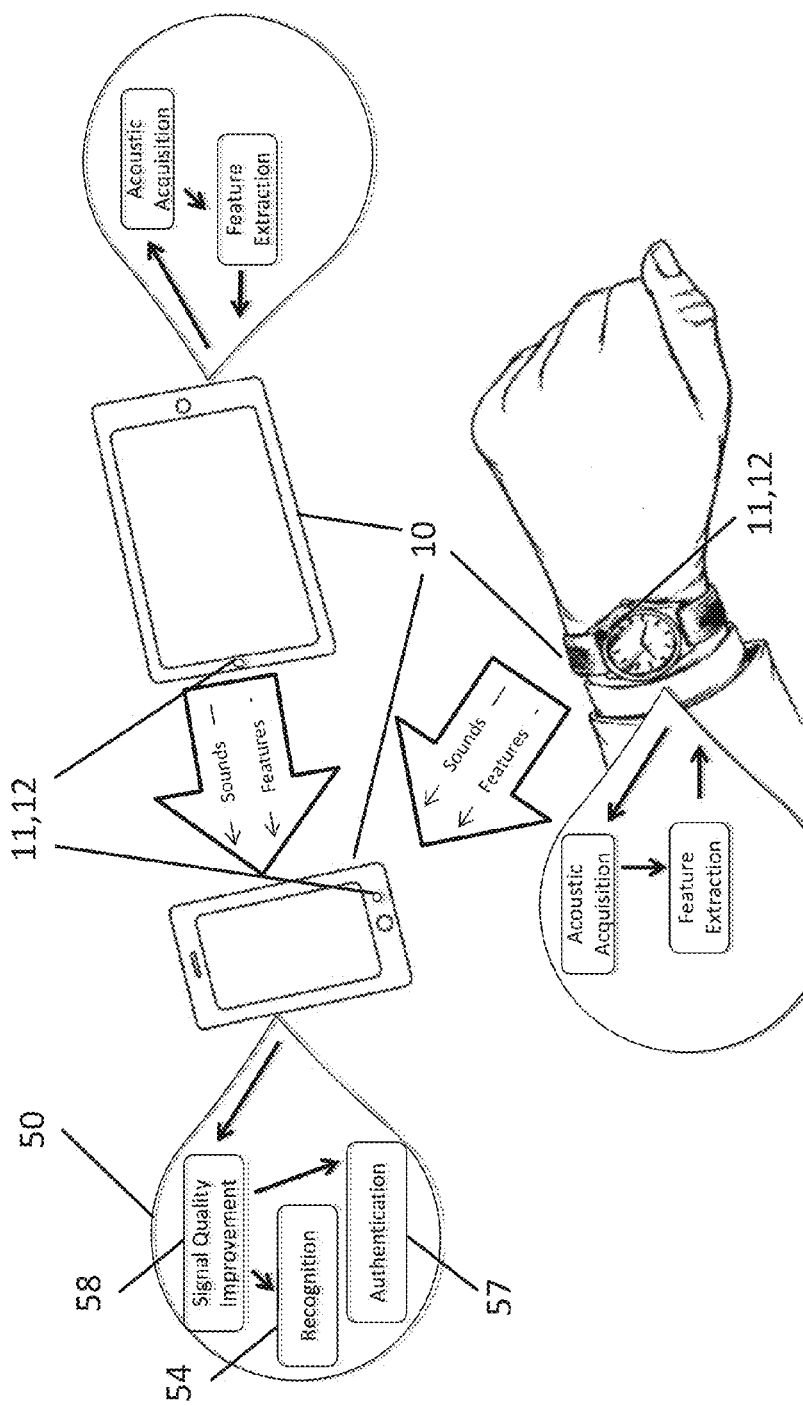
FIG. 16 illustrates a method to improve signal quality using multiple devices collaborating with one another to pass samples, sounds and/or features to one or more other devices.

Those knowledgeable in the art will recognize that multiple microphones are commonly utilized within the same device to improve signal quality. Multiple microphones within a single device are often called "microphone arrays". Similar to how an array of microphones on a single device 10 is commonly used to improve signal quality, one or more sensors 11, such as but not limited to microphones 12, within multiple devices 10 in close proximity to one another could also be used to improve to improve services 50 such as but not limited to acquisition, signal quality 58, recognition 56, and/or authentication 57 as shown in FIG. 16.

In lieu of using multiple microphones within a single device, aspects of this invention may use multiple devices that each contain one or more sensors 11 to collaborate with one another to perform and improve various collaborative services such as but not limited to those services listed in FIG. 6. Advantageous techniques that can be used to improve acoustic capture and authentication in particular include background noise cancelation and beam-steering, as non-limiting examples.

Beam steering is a method that measures the time and strength of acoustic data collected from multiple microphones to "steer" one or more of the microphones to thereby improve signal quality from one or more sources.

Noise cancellation is a technique to improve signal quality that utilizes acoustic data collected from multiple sources and processes that data to cancel out background noise that is out-of-phase with foreground desired signals, such as sounds and/or speech, as non-limiting examples.

This collaborative service of using one or more sensors 11 on multiple devices 10 to improve signal quality is called "collaborative signal quality improvement" 58 as shown in FIG. 16.

In order to perform certain collaborative services such as but not limited to collaborative signal quality improvement, data collected collaboratively across multiple devices in proximity to one another may need to be synchronized. Synchronization between one or more devices 10 may be achieved by one device sending a sync packet to other devices within a cluster as it begins to perform its own sound detection. In this method, the sync packet 31 is similar to a heartbeat signal that synchronizes two or more devices 10 over some wireless communications medium such as but not limited to Bluetooth or ultrasonic audio, and may also contain other information such as but not limited to a wake-up signal to wake-up all other devices within the cluster as shown in FIG. 6.

In some embodiments, internal clocks may synchronize to the sync packet to a predetermined PPM (parts per million) accuracy. Synchronization may also be required to perform other collaborative services such as control across multiple game controllers with local accelerometers and collaborative services that require specific timing between devices 10. This collaborative service of synchronizing between multiple devices 10 is called "collaborative synchronization" 59 and is referred to in FIG. 6.

Like collaborative synchronization, proximity location may be determined based on a variety of methods including but not limited to sharing geo-location information collected by each device 10 via GPS and/or measuring signal strength, time of arrival (TOA) and/or RFDOA (Radio Frequency Direction of Arrival) and the like. In this embodiment, a sync signal between devices 10 can also provide a relative signal strength that can be utilized to determine relative proximity of each device from each other, as well as the source of a signal. Derivation can be performed using methods such as triangulation, RFDOA, TOA calculation and the like, and/or combinations. One or more devices may be configured to detect if one or more other devices are missing, in some embodiments, for a configurable period of time, and send alerts to the user or to other devices to alert the user of the missing device. This collaborative service is reference hereafter as "collaborative proximity location" 62 and referred to in FIG. 6.

In another embodiment, the recognition model is continuously improved as more devices use a specific recognition model within various environments. Under this method, devices 10 may send collected sound data 20 to one or more other elected acoustic models on other devices, which thereby may update the model for a specific sound, word or phrase and redistribute the updated model to all devices 10 within the cluster. This method of systematic updating/training of a common acoustic recognition algorithm is called "collaborative model training and updates" 55 as shown in FIG. 6. See also FIGS. 8 and 11.

Figure 17:
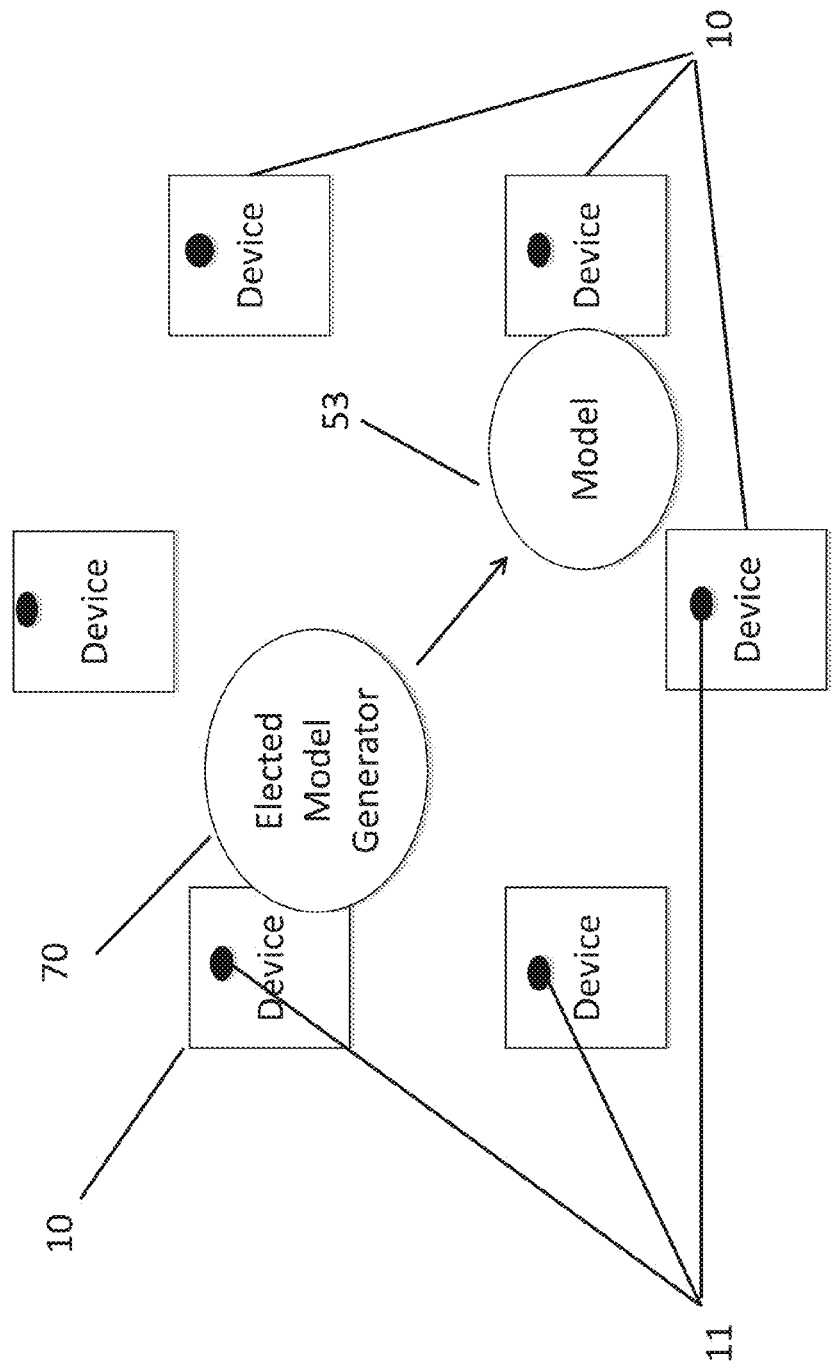
FIG. 17 illustrates a model generator that generates and distributes one or more models to one or more devices.

Any sensor 11 on any device 10 may be used to collect and send data to one or more other devices that have the computational power and battery life to support training of one or more models 53. Since some devices 10, such as cell phones and laptops have more processing power than other devices, such as wearables, the devices 10 may negotiate which one(s) is best suited to perform a part or all of any service 50. In this sense, device(s) 10 selected to train and distribute the algorithm are referenced hereafter as "elected model generators" 70 as shown in FIG. 17.

Once training of the model(s) has been performed, a common model 53 can then be distributed to each device 10 to perform recognition locally on the device 10, remotely on a server 13 (see FIG. 12) or a cloud, or in some cases, distributed across multiple devices 10 within a collaborative cluster.

In some circumstances, models 53 may be cached for distribution until one or more devices 10 come into proximate communications with one another, making their models available for updating. Conversely, features and/or samples captured by any device may be cached until connection with an elected model generator 70 of FIG. 17 is available to update the model. Once communication is established and a device selected as the elected model generator and is authenticated, samples, sounds and/or features may be sent by a device to the elected model generator.

Under this approach to model adaptation, the more samples, features, etc. (referred to generally as data) that are used for recognition by more devices in more environments, the more accurate the model and the more accurate subsequent recognition and authentication processes. As more data is sent to one or more elected model generators, the model is adapted to perform in richer and more diverse environments, improving the performance of the model for all devices within a cluster, as well as new devices as they are later added to the cluster.

In some instances, a device may alone determine that it is time to update its recognition model when, for example, a recognition or risk score is high enough to authenticate a user, but lower than usual. The score may land between thresholds where one threshold measures whether the recognition or risk score is weaker than usual, but is still high enough to exceed a second threshold to approve authentication, as a non-limiting example. In such instances, the device may detect some interference that may indicate a new environment or noise that might help the acoustic model better authenticate the user in the future, and thus decide to send data to a model generator to update one or more of the recognition models.

Figure 18:
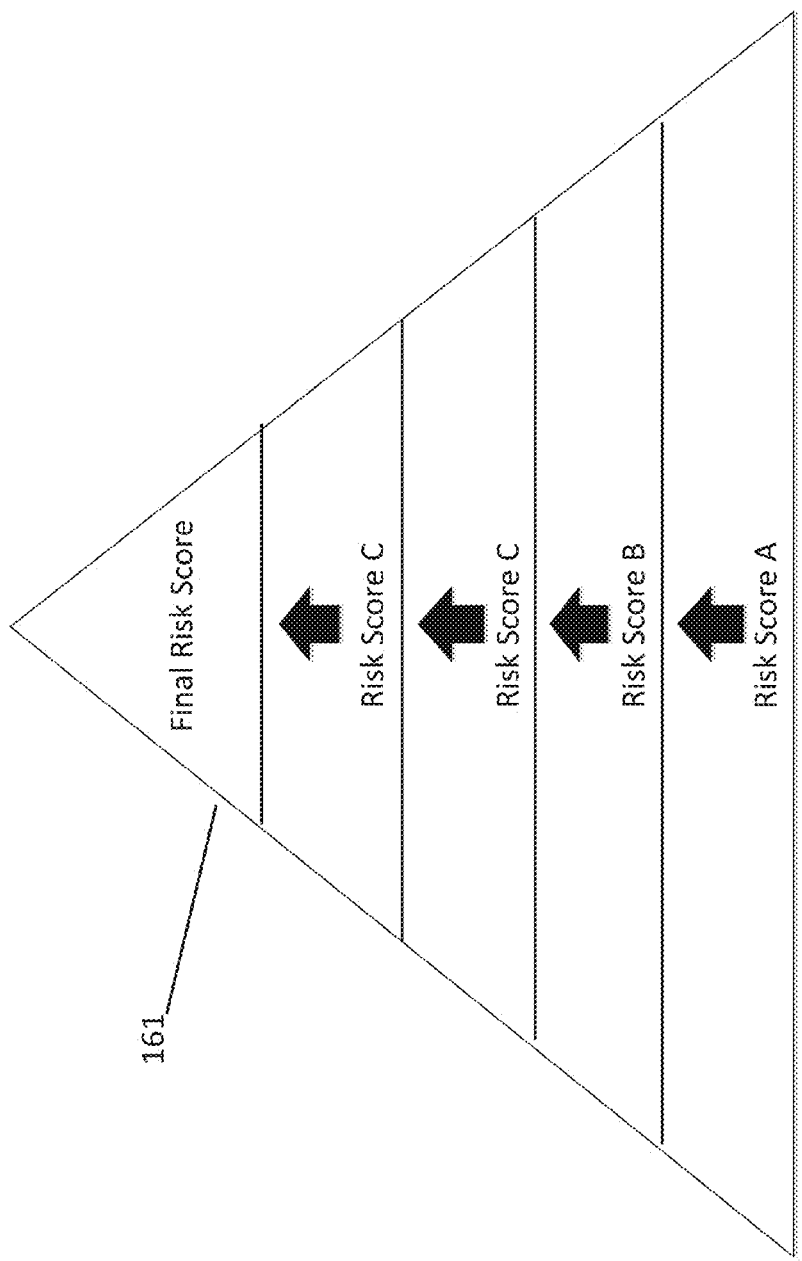
FIG. 18 illustrates the pyramid of trust.
Figure 19:
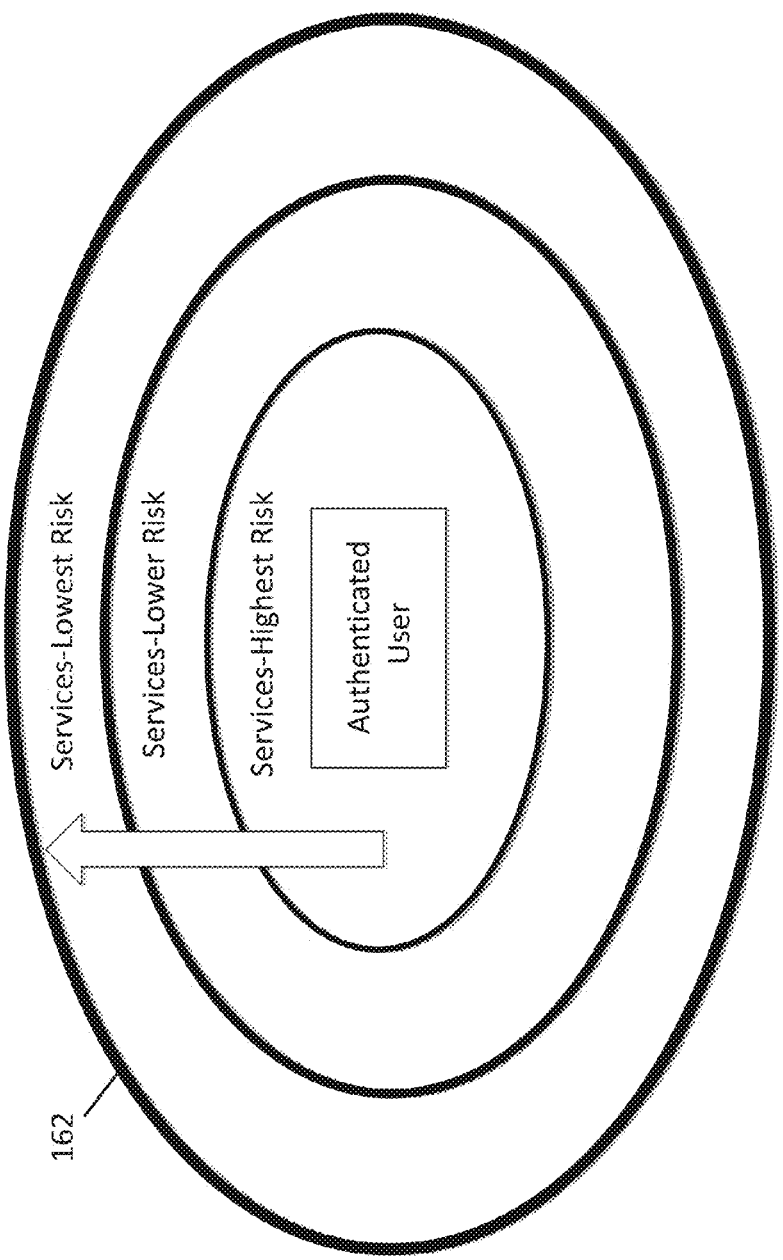
FIG. 19 illustrates the circles of access.

Access to some collaborative services may require that a user has a higher level of authentication/recognition score than the recognition score required for other services. The level of service is matched to specific recognition and/or risk score that is derived from authentication of an individual and/or device. The risk level is called the "Pyramid of Trust" 161 hereafter as shown in FIG. 18 and the level of services is called "Circles of Access" 162 hereafter as shown in FIG. 19. Thus, the higher the collaborative recognition scores or the lower the collaborative risk scores, the larger the user's circle of access 162, i.e., the more services to which the user will have access as shown by a larger circle in FIG. 19.

A Pyramid of Trust 161 is a hierarchical model of recognition and/or risk scores as illustrated in FIG. 18. Each level of the pyramid is derived from various risk assessments that include but are not limited, risk scores, recognition scores, the authentication process employed, the biometric used, the time of the last source authentication, and the like, as non-limiting examples. The pyramid level (or authentication class) is thus indicative of the accuracy or confidence of the source authentication. Rather than dictated to specific authentication types and/or scores, this method provides a flexible model where multiple devices may authenticate in a collaborative environment and provide Circles of Access based on risk scores, rather than being depending on rigid permission tables between devices that commonly cause immense administrative burden.

Circles of Access 162 are access levels that dictate what services may be provided to an authorized user or device. Rather than simple levels of access dictated by permission settings, Circles of Access are dynamic, changing the services that may be offered at a given time based on factors dictated by members of a cluster of devices. For instance, the votes of some members of the cluster may carry more weight than other members, based on parameters related to authentication, including but not limited to the type of authentication used, the recognition and/or risk score, etc. The Pyramid of Trust governs the circles of access a cluster of devices offers to an individual or to a device as it is authenticated.

Non-limiting examples of improving access based on trust include use of collaborative authentication methods. A user may access a smart wallet by speaking a single word, as one non-limiting example. A speaker-independent acoustic recognition model may recognize the single word, for example. But, to authorize a specific account for a payment transaction, a user may have to prove he or she is the owner of the account by having the same word or sound be recognized by one or more speaker-dependent and/or speaker-independent models, or a combination model that recognizes both the word and the speaker, for example.

Likewise, another non-limiting example might require a sound, such as but not limited to voice, to be recognized by more than one device to gain enough trust to achieve inclusion within a certain circle of access. In yet another non-limiting example, multiple authentication factors may be required such as voice+PIN and/or voice+pattern or gesture. In another non-limiting example, multiple authentication methods may be required such as voice plus face and/or voice plus finger print, and from one or more devices. In one example, a user may be required to authenticate according to one or more other methods (such as but not limited to optical for facial recognition and/or gait, gesture, mannerism, etc. recognition) and by one or more devices. This distributed technique of authentication service improves security substantially, since more than one sensor on more than one device and more than one authentication modality improves trust in the recognition score and thus makes it much harder to spoof authentication.

In some embodiments, a recognition score derived on one device may not be high enough to authenticate and/or grant a specific circle of access or access level required for desired services. Authentication methods, models, scores, sensors and/or devices may be requested by one or more devices, and/or the distributed authentication service, to improve recognition scores prior to granting authentication.

In such embodiments, other device may request further authentication from other devices. Other devices may respond by authenticating with the requesting device and/or other devices, and provide collaborative services.

In one embodiment, an elected model generator may detect that it needs more data for training, and solicit data from devices 10 (inside its cluster) having various sensing features. In this way, one device 10 can request data from other devices 10 to update its sound recognition model.

In one embodiment an elected model generator may solicit more acoustic data from devices 10 outside its cluster, but only if the solicited device can be authorized by the soliciting device.

Since some devices, such as wearables, may remain idle, another device may "awaken" the wearable. These collaborative services may be activated by a wake-up signal that is sent from one or more devices 10 to one or more other devices 10 within the cluster 40, as shown in FIG. 5. In some embodiments, the wake-up signal 31 is a frequency signal at one or more frequencies that resonate with a circuit internal to a device to provide power that awakens the device and awakens a microprocessor, for example, within the device 10. In other embodiments, the wake-up includes an accelerometer that dictates the operational "state" of one or more devices. In one embodiment, the wake-up signal 31 also includes or is followed by an authentication process.

In some embodiments, the wake-up circuitry may also harvest the energy to power the circuit and/or device from the wake up signal. In other embodiments, wake-up may be performed via inductive coupling. In yet another embodiment, direct contacts between devices may be used to wake-up and/or authenticate one or more devices.

In one non-limiting example, microphones and/or microphone arrays on devices 10 could all be "active", sensing continuously and collaborating with each other continuously. In another embodiment, the sensors 11 and/or the devices 10 could be active for specific period(s) of time. In yet another embodiment, sensors 11 on devices 10 can be discontinuously sampling at various intervals that could be periodic and/or random. In certain embodiments, the sensors 11 may be biometric sensors such as but not limited to face, finger, IRIS, eye, eye corner, scent, heartbeat, skin, in addition to voice and sound.

In some embodiments, one device may send a wake-up signal to the other devices 10. If received, the "idle" device would wake-up and begin sampling and/or performing recognition. In some instances, one or more sensors may awaken based on user activity such as but not limited to pushing a button and/or a touch screen, and/or making a noise.

Devices within a collaborative cluster may not only be idle, but semi-passive, where a device is completely passive (e.g. OFF) in an idle state, but utilizes a battery after it is awakened from a passive state. In such instances, the wake-up signal will wake-up the semi-passive device where the semi-passive device utilizes an internal power source to continue operation. In other embodiments, devices within a collaborative cluster may not only be idle or semi-passive, but completely passive. In such instances, the wake-up signal will not only wake-up the passive device, but also then harvest power from the wake-up signal and/or other energy sources to continue operation. Thus, in two non-limiting examples, a battery powers the semi-passive device after wake-up, or the passive device is powered by harvesting energy from the wake-up signal.

Generally, as devices within a cluster awaken from a passive or semi-passive state, they may immediately authenticate, collaborate, share data and/or circles of access with one another, and/or perform local recognition before performing and collaborative services.

Devices that have been deemed an elective model generator may train one or more models (within the devices) with data and/or features collected from multiple microphones within the microphone cluster. Each model may be associated with a specific sound. Sounds may include voice, where a user may dictate specific commands to perform some action, as a non-limiting example. Commands that are correlated to specific action such as payment, as a non-limiting example, are said to be "voice directed". In such embodiments, voice and a word or phrase can be uniquely identified to authenticate a specific individual and/or action, such as a payment, as a non-limiting example as described in a commonly-owned patent application entitled Voice Directed Payment System and Method, filed as a provisional application on Feb. 10, 2015 assigned application No. 62/114,357, and converted to a non-provisional application by patent application Ser. No. 15/040,984 filed on Feb. 10, 2016 and bearing the same title.

In one embodiment, sound captured by one or more devices may be pre-processed to extract features and send the extracted features to one or more model generators 70 of FIG. 17. In another embodiment, only the data captured by one or more devices 10 may be sent to one or more model generators 70. In yet another embodiment, recognition and/or risk scores may be sent to other devices to improve an overall awareness of all devices to the identity of a specific individual detected by one device within the cluster. In some embodiments, inter-awareness of an identity by multiple devices may improve security as well as facilitate user access to other devices, features and services (e.g. Circles of Access 162 of FIG. 19) without repeated "logins" as are typically required today.

In one embodiment, one or more acoustic models are used for each specific sound, word or phrase. With a correlation between acoustic models and action after authentication, if an account or action is deleted, an associated model is deleted as well, rather than using a single monolithic model that deletes everything.

In yet another embodiment, one device may send an audio signal that is detected by the other devices within the cluster. In some instances, this audio signal may be transmitted via a frequency that is outside of a human hearing range.

As a non-limiting example, FIG. 1 contemplates a user speaking into one device 10, such as a smart watch, which in turn sends a wake-up signal to a smart wallet and a cell phone to wake-up these devices for capturing the same audio. All three devices may then collaborate with each other to perform some service, such as collaborative training, signal improvement, and/or authentication, as non-limiting collaborative service examples. In contrast, each of the three devices 10 could perform voice recognition individually, and collaborate the recognition score derived from each device 10 to achieve collaborative recognition and thereby a collaborative recognition score. In yet another example, all three devices 10 are required to be present to authentication a source, authorize an action, or access a service.

Multiple devices 10 may collaborate with one another to improve authentication or risk scores. In such instances, each device 10 will respond to another device 10 with its own confidence/authentication/risk score. Alternatively, one device may send "authentication" approval to one or more other (receiving) devices such that the receiving devices will know who/what has access to which devices or services within the "internet of things."

In another non-limiting example, FIG. 3 illustrates performance of the invention within a typical room. To enter a room, an individual 100 may speak to one or more wearable or mobile devices 10 such as a smart watch, smart wallet, and/or a cell phone as shown in FIG. 1. Once authenticated to the wearable or mobile device 10, it communicates authentication to a device within the room, such as the doorknob 101 thereby allowing the user to use the doorknob 101. If, for example, the doorknob does not accept authentication with the wearable device, it may request additional authentication-type credentials. The wearable device 10 may be able to supply these credentials or may collaborate with one or more other of the devices within the room to acquire the additional credentials requested by the doorknob 101 to authenticate the individual.

Once within a room, all devices within the room can be awakened by the doorknob 101 and/or by one or more of the wearable or mobile devices 10. The user 100 can then be authenticated to a specific circle of access 164 to facilitate the "internet of things". Non-limiting examples of devices within the "internet of things" may include blinds 102, televisions 103, thermostats 104, fans and/or lights and/or switches 105 to control each, alarm systems 106, appliances 107, and digital picture frames 10, as shown in FIG. 3.

Access to components within a different circle of access, components such as a laptop 109 or a specific website on the laptop 109 may require a higher level of authentication. For such an example, any one or more of the devices 10 may respond to a request from the laptop 109 for further authentication credentials to move the risk score up the pyramid of trust 161 (FIG. 18) to allow access to devices and services within a higher level circle of access.

Using the collaborative recognition process, the present invention offers advantages to detect spoofing. Spoof detection is inherently improved by this invention by using multiple devices to recognize the same sound while rejecting sounds generated from a recording. Each sensor (on a single device or multiple devices) within a cluster contributes to one or more recognition models that are then distributed to each device within the cluster. When these models are used in the recognition/authentication process, a sound generated from a microphone that did not participate in the training process will contain distinct characteristics of the microphone and acoustic processing electronics that are unique to that device. Characteristics may include but are not limited to envelope shape, low or high frequency SNR (signal to noise ratio), modulation index and/or data communicated with the signal. A certain level of uncertainty is inherent when a single device detects these characteristics and thereby detects a potential spoof. This uncertainty is reduced when multiple devices detect these same characteristics.

Another method of this invention improves the common problem of the so called "aliveness test" where a user is requested to repeat random sounds, words or phrases, or in some cases, a series of digits, all of which is susceptible to cut-and-paste attacks. This invention improves this susceptibility by using one device to request the random sound, word, phrase, or series of digits, while one or more other devices may also recognize the sound, word, phrase or series of digits, rather than only a single device, thus eliminating the possibility of a cut-and-paste attack. In some embodiments, further protection can be achieved by one device 10 asking another device to request the random word, phrase, or series of digits, thereby making the attack less likely to succeed.

Yet another method of this invention that may also prevent spoofing involves one or more devices outputting one or more acoustic signals during sound recognition. This acoustic signal may consist of one or more specific frequencies, music, noise or modulated data such as but not limited to ones or zeros, or some code. In some embodiments, the signal may be at one or more frequencies outside of a human hearing range. In still other embodiments, the signal may consist of modulated data may include but not be limited to a code, and could include FSK (Frequency Shift Keying) and/or PSK (phase shift keying), such as BPSK (Bi Phase Shift Keying) or QPSK (Quadrature Phase Shift Keying) and/or ASK (Amplitude Shift Keying), or combinations of each. Under this method, a recording would not be recognized since it would contain a signal from a previous authentication attempt, which would be recognized and rejected. These and other methods of collaborative recognition prevent interception and recording of a specific sound from being reused by an unauthorized user.

The invention described herein will work for speaker dependent as well as speaker independent recognition, as well as collaboration between biometric sensors, on the same or different devices, of different modalities. In one non-limiting example, heartbeat and voice could be collected by different devices and recognized local to a single device, or distributed to several devices where each biometric is recognized local to the device containing the biometric sensor, but authentication is collaborated between devices 10 before access is granted. In other non-limiting examples, face and voice and/or finger and iris could be collaborated across devices before an individual is authenticated.

Under one system and method of the present invention data may be stored, accessed, retrieved, encrypted or decrypted from one one or more devices based upon access granted from one or more collaborative services. In one embodiment, one or more biometrics and/or behavior metrics sensed on one or more devices may be used to authenticate one or more users, objects, devices or "things". After or during access, the distributed authentication service may enable calculation, storage, access, retrieval, encryption and/or decryption to data from one or more other devices. In some embodiments, the same cryptographic "key" or portion of a key used for authentication may also be used for encryption and/or decryption.

Under one embodiment, multi-device encryption may be achieved by requiring two or more devices to generate the encryption key and or authenticate, or encrypt, decrypt, store, retrieve or access data on one or more devices, or perform a specified action. In alternative embodiments one or more devices may take on one or more of these responsibilities while one or more other devices take on one or more of the other three responsibilities.

Biometrics used may include but are not limited to voice, brain signals, brain waves, facial recognition, or the like, while behavior metrics may include but are not limited to gesture, gait, mannerism, expression and the like.

Various aspects and embodiments of the invention may include at least the following.

A distributed system and method to improve sound recognition across microphones on various devices, with each device comprising a single microphone or multiple microphones. The system and method comprises one or more microphones, microphone arrays and/or acoustic sensors present on one or more devices, an acoustic recognition algorithm common to two or more devices, and wherein devices may collaborate with one another via a communications medium to improve the accuracy of sound recognition and thereby authentication.

According to the method one device sends information to one or more other devices to train one or more acoustic models. Sending the information may be in response to a request for information from one or more of the other devices or the sending may be self-directed by the sending device.

The information may comprise acoustic data, voice data, one or more features extracted from captured sound or voice, one or more recognition scores, and one or more risk scores.

The one or more common acoustic models may be distributed to one or more of the other devices.

The acoustic recognition models may be resident on each device or may be cached or buffered until each device has its acoustic model updated to the current version of a common sound recognition acoustic model or acoustic algorithm.

The devices may be part of a microphone cluster such that they recognize each other via authentication processes.

Each of the devices contributes to the common sound recognition acoustic algorithm by sending information to one or more devices.

The sound recognition acoustic algorithm may be located locally to each device, on a separate device but within communications range of another device, or distributed to each of the devices.

The devices may collaborate with one another to elect one or more devices to train one or more of the sound recognition acoustic models. The decision as to which device or devices are elected to train one or more sound recognition acoustic models may be based on combinations of factors. These factors include, but are not limited to: computational power, power availability, bandwidth, battery availability, the number of devices that a device can communicate with, stationary versus mobile devices, etc.

The devices may collaborate to find a path to a device, such as a server, that stores a sound recognition acoustic model update.

The sound recognition acoustic models may be speaker dependent or speaker independent.

The sound recognition acoustic models may recognize one or more of speaker, spoken word, spoken phrase, and a non-vocal sound.

Any one of the devices may wake-up one or more other devices from an active, idle, semi-passive or passive state.

The devices may comprise mobile devices such as cell phones, tablets, laptops, vehicles, and/or wearable devices such as but not limited to smart wallets, electronic wallets, watches, rings, ear rings, necklaces, bracelets, anklets, buttons, key chains and the like.

The devices may be static devices such as but not limited to desktops, servers, lights, light switches, televisions, music equipment, home automation devices, thermostats, fire alarms, alarms, security equipment, blinds, drapes, fans, cloud-based computing devices and the like.

The devices may also comprise appliances such as but not limited to stoves, refrigerators, microwaves, cooking tools, ovens, crock pots, dishwashers, and the like.

The sound referred to herein may comprise voice, whistles, clicks, claps, music or virtually any sound that a user can produce.

Any of the devices may send information to another device to update one or more sound recognition acoustic models. That information may be in the form of acoustic data, voice data, voice samples, features extracted from captured sound or voice, recognition scores, recognition scores below a predetermined threshold, risk scores.

If a sound recognition acoustic model generates a value below a predetermined threshold, this triggers training of one or more sound recognition acoustic models.

Although certain aspects of the invention have been described in the context of a vocal sound or utterance, such is not required as there are many different audio or physical activities that can be used to authenticate a user or a source to an access-controlled area or system, such as gestures and passwords. All are considered within the scope of the present invention.

In addition to voice and biometric recognition, various other data and communications services can be executed on multiple devices, thereby improving the speed, accuracy, power consumption, etc. of the result. The use of multiple devices can also benefit from the unique capabilities of each one of the multiple devices, thereby segregating the tasks associated with the data or communications services to the device best capable of handling that task.

As used herein "determining" information, including determining the information from a sensor or from a source, may refer to determining raw or original information from the sensor or from the source or determining derived information that had been derived from the original information. Determining information also includes any manipulation or transformation of that information, including, but not limited to, generating, calculating, formulating, encrypting, decrypting, transforming, storing, and modifying, of the original or derived information.

Embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described herein with reference to example applications for illustration only. It should be understood that numerous specific details, relationships, and methods are set forth to provide a full understanding of the embodiments disclosed herein. One having ordinary skill in the relevant art will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with the embodiments. All examples and exemplary alternatives set forth in the application are merely for illustration and are intended as non-limiting examples and alternatives.

What is claimed is:

1. A system for performing a task for or providing a service to a source, the system comprising:
    a first device having a first sensor for receiving recognition information from the source and transmitting the received recognition information to a second device;
    the first and second devices for independently processing at least different portions of the recognition information, wherein the first and second devices use a common recognition model or use a different recognition model to process the recognition information, and the first and second devices independently assigning a respective first and second recognition score to the source, wherein the second device is communicatively linked to the first device, a dynamic paring code derived from each of the independently assigned recognition scores;

one or both of the first and second devices authenticating the source responsive to the first and second recognition scores by collaboratively determining whether the source is authenticated based on the dynamic paring code; and responsive to the source having been authenticated, the first or second device for performing the task or for providing the service to the source.

2. The system of claim 1 wherein the task or service comprises an action, control, alert, alarm, notification, command, or request.

3. The system of claim 1 wherein each of the first and second devices utilizes a different recognition model in processing the recognition information.

4. The system of claim 1 wherein after the source has been authenticated, one or both of the first and second devices stores, retrieves, encrypts or decrypts calculates, modifies, or transforms data on one or both of the first and second devices.

5. The system of claim 1 wherein one or both of the first and second recognition scores are sent to the respective second and first devices for authenticating the source.

6. The system of claim 1 wherein the source is authenticated if one or both of the recognition scores exceeds a predetermined threshold.

7. The system of claim 1 the first and second devices for analyzing the recognition information according to operating capabilities of each one of the first and second devices, the operating capabilities comprising, power, bandwidth, proximity, processing power, range, availability, memory capacity, available power, first sensor type, and first sensor quality.

8. The system of claim 1 wherein one of the first and second devices requests additional or different recognition information from the source of from another of the first and second devices for use in assigning a recognition score.

9. The system of claim 1 wherein the source comprises a human, a physical object, the first device, or the second device.

10. The system of claim 1 wherein the communicatively linked condition comprises the first and second devices authenticated to each other.

11. The system of claim 1 wherein the recognition information comprises sound samples, speech samples, sound features, speech features, voice, whistles, clicks, claps, music, behavior metrics, or biometrics.

12. The system of claim 11 wherein the recognition information received by the second device comprises all of the recognition information received by the first sensor or a portion of the recognition information received by the first sensor.

13. The system of claim 1 the first device for analyzing the recognition information using a first recognition model and the second device for analyzing the recognition information using a second recognition model, the first recognition model different than the second recognition model.

14. The system of claim 13 wherein the first and second devices exchange information related to the first and second recognition models for use in training or updating the first and second recognition models.

15. The system of claim 1 the first and second devices for independently assigning a risk score for use in authenticating the source.

16. The system of claim 15 wherein one or both of the recognition score and the risk score are used to assign the source to an authentication class indicative of the risk level of transactions to be executed with the source.

17. The system of claim 1 wherein the recognition information comprises recognition information from a sensor on one or both of the first and second devices or comprises derived recognition information derived from the recognition information.

18. The system of claim 1 further comprising the second device having a second sensor, wherein the recognition information is sensed by both the first and second sensors and a synchronization packet is exchanged between the first and second devices to synchronize sensing of the recognition information at the first and second sensors.

19. The system of claim 1 wherein one of the first and second devices facilitate a control service for controlling one or more of a door lock, a window blind, a television, a home automation device, a thermostat, a light, an irrigation system, a fan, a light switch, an alarm system, an appliance, a digital picture frame, a cooking utensil, music equipment, gaming equipment, a server, a computer, a tablet, a vehicle, a garage door opener, or a keyless lock.

20. The system of claim 1 wherein one of the first and second devices comprises a cell phone, a watch, a wallet, a necklace, a bracelet, a ring, or a wearable.

21. A system for performing a task for or providing a service to a source, the system comprising:

a first device having a first sensor for receiving first recognition information from the source;

a second device having a second sensor for receiving second recognition information from the source;

the first and second devices for independently processing at least different portions of the first and second recognition information, wherein each of the first and second devices uses a common recognition model or uses a different recognition model and each independently assigns a recognition score to the source, wherein the second device is communicatively linked to the first device, a dynamic paring code derived from each of the independently assigned recognition scores;

one or both of the first and second devices for authenticating the source responsive to the first and second recognition scores by collaboratively determining whether the source is authenticated based on the dynamic paring code; and responsive to the source having been authenticated, one of the first and second devices for performing the task or for providing the service to the source.

22. The system of claim 21 wherein the first and second devices independently processing the respective first and second recognition information or processing different portions of the first and second recognition information is based on operating characteristics of each of the first and second devices.

23. The system of claim 22, wherein the operating characteristics of each of the first and second devices, comprise, power, bandwidth, proximity, processing power, range, availability, memory capacity, available power, first and second sensor type, and first and second sensor quality.

* * * * *